US010445941B2

(12) United States Patent
Niles

(10) Patent No.: US 10,445,941 B2
(45) Date of Patent: Oct. 15, 2019

(54) INTERACTIVE MIXED REALITY SYSTEM FOR A REAL-WORLD EVENT

(71) Applicant: Number 9, LLC, New York, NY (US)

(72) Inventor: James E. Niles, New York, NY (US)

(73) Assignee: NUMBER 9, LLC, New York, NY (US)

(*) Notice: Subject to any disclaimer, the term of this patent is extended or adjusted under 35 U.S.C. 154(b) by 7 days.

(21) Appl. No.: 16/014,956

(22) Filed: Jun. 21, 2018

(65) Prior Publication Data

US 2018/0374268 A1   Dec. 27, 2018

Related U.S. Application Data

(60) Provisional application No. 62/522,872, filed on Jun. 21, 2017.

(51) Int. Cl.
| | |
|---|---|
| *G06T 19/00* | (2011.01) |
| *H04N 21/2187* | (2011.01) |
| *G06T 7/70* | (2017.01) |
| *G06F 3/01* | (2006.01) |
| *H04N 21/218* | (2011.01) |
| *H04N 21/81* | (2011.01) |

(52) U.S. Cl.
CPC ............ *G06T 19/006* (2013.01); *G06F 3/011* (2013.01); *G06T 7/70* (2017.01); *H04N 21/2187* (2013.01); *H04N 21/21805* (2013.01); *H04N 21/816* (2013.01)

(58) Field of Classification Search
CPC .......... G06T 19/006; G06T 7/70; G06F 3/011
See application file for complete search history.

(56) References Cited

U.S. PATENT DOCUMENTS

| | | | |
|---|---|---|---|
| 9,761,045 B1* | 9/2017 | Cote | G06T 17/10 |
| 2010/0128121 A1* | 5/2010 | Wilkinson | H04N 5/272 |
| | | | 348/135 |
| 2018/0343421 A1* | 11/2018 | Kahle | G06T 7/70 |

* cited by examiner

*Primary Examiner* — Ryan R Yang
(74) *Attorney, Agent, or Firm* — Dorsey & Whitney LLP

(57) ABSTRACT

Embodiments are directed to systems and methods for automatically customizing a mixed reality immersive, environment scene of a real-world event. Capture devices (e.g., mobile phones) positioned at the real-world event may capture scenes from the event at different points of view. A remote processing unit may generate a mixed reality environment based on a three-dimensional representation of the real-world event from the captured scenes and various virtual elements. A remote user device may display a representation of this mixed reality environment and detect associated input at the device. The processing unit may, in turn, simulate manipulation of the real-world scenes based on the detected input.

20 Claims, 11 Drawing Sheets

Example of Mobile MRI Platform while User is
Physically Located at the Live Event

INTERACTIVE MIXED REALITY SYSTEM FOR A REAL-WORLD EVENT

CROSS-REFERENCE TO RELATED APPLICATION

This application claims priority to U.S. Provisional Application No. 62/522,872, filed on Jun. 21, 2017, the disclosure of which is incorporated by reference herein in its entirety.

FIELD

The described embodiments relate generally to systems and methods for generating a mixed reality environment based on a real-world event. More particularly, the present embodiments relate to simulating manipulation of real-world events in a mixed reality environment. This may allow a user, player, end-user, and so on to experience a real-world event, such as an active live event, without physically attending the event.

BACKGROUND OF THE INVENTION

Users now expect a seamless and enhanced user experience when watching broadcasted live event(s), and as such, when a user is unable to attend a live event, the overall experience may be lacking. While a user may watch a live event broadcasted on a television (TV) or listen to a live event, the experience is limited. Examples of a live event could be a musical, theater, football, hockey, soccer, baseball, basketball, horseracing, tennis, automobile racing, and swimming, Olympics or any other team activity where at least two or more teams are competing against each other. These live event examples are not limited to those shown but as an example of live events which allow spectators to watch and/or participate. Other live events may include substantially any other assembly of participants and spectators, including those that are organized by a distributed group of participants or are otherwise informally initiated, such as a flash mob. In today's environment, more and more live events are taking place throughout society and some are within a location that may not be readily accessible by a user for one reason or another. Examples of why a user may not attend a live event could be location of event, cost of attending live event, or live event is in a language other than the user native preferred language. These reasons on why a user may not attend a live even are not limited to those listed but just an example of why a user may not have a fulfilled user experience.

Considering that millions of people attend live events world-wide each year, it is a frequent occurrence that users are unable to have the "live" experience of the event as they are not immersed within the action of the live event. As such, users must rely on broadcast television or radio for the event experience which is very limited and non-fulfilling.

While industries have attempted to provide consumer(s)/end-user(s) a complete user experience for a broadcasted live event, they have fallen short because of limited interaction between user and live event. Thus, while these limited interaction may be suitable for the particular purposed employed, or for general use, they would not be as suitable for the purpose of the present disclosure as disclosed hereafter.

In the present disclosure, where a document, act or item of knowledge is referred to or discussed, this reference or discussion is not an admission that the document, act or item of knowledge or any combination therefor was at the priority date, publicly available, known to the public, part of common general knowledge or otherwise constitutes prior art under the applicable statute provisions; or is known to be relevant to an attempt to solve any problem with which the present disclosure is concerned.

While certain embodiments of conventional technologies have been discussed to facilitate the present disclosure, no technical embodiments are disclaimed and it is contemplated that the claims of this application or any future application claiming the benefit of this application may encompass one or more of the conventional technical embodiment discussed herein.

BRIEF SUMMARY OF THE INVENTION

Embodiments of the present invention are directed to systems and methods for remotely interacting with a real-world event.

Some embodiments include a system for remotely interacting with a real-world event. The system can include a group of capture devices. Each of the group of capture devices can include a camera configured to capture scenes of the real-world event. The system further includes a position sensor configured to detect a position of the group of capture devices. The system further includes a processing unit communicatively coupled with the group of capture devices over the distributed network. The processing unit is configured to receive, from each of the group of capture devices, the captured scenes. The processing unit is further configured to receive, from the position sensor, the detected position of the group of capture devices. The processing unit is further configured to generate an immersive representation of a physical environment of the real-world event using the captured scenes from at least two capture devices of the group of capture devices and the detected position of the at least two capture devices. The processing unit is further configured to generate a mixed reality environment of the real-world event by modifying the immersive visual representation of the physical environment with virtual elements. The processing unit is further configured to transmit a signal including information of the mixed reality environment over one or both of the distributed network or a local connection.

Embodiments of the system can further include a first user device communicatively coupled with the processing unit. The user device includes a communication device configured to receive the signal. The first user device further includes a display configured to depict the mixed reality environment based on the information of the signal. The first user device further includes an input device operatively coupled with the display and configured to detect input in response to a depiction of the mixed reality environment. The processing unit is further configured to modify the mixed reality environment in response to the input of the input device.

For example, in an embodiment, the processing unit may be further configured to, in response to the input, generate a constructed asset in the mixed reality environment that simulates manipulation of the immersive representation of the physical environment.

In another embodiment, the input device includes a sensor configured to detect a characteristic of the input. The processing unit may be further configured to modify the constructed asset in a first manner based on the characteristic of the input being a first value and modify the constructed asset in a second manner based on the characteristic of the input being a second value. In some cases, the input may be one or more of a touch input, a force input, a gesture, or a voice command. The input device may be further configured to detect a subsequent input in response to a depiction of the constructed asset in the mixed reality environment. As such, the processing unit may be further configured to modify the constructed asset in response to the subsequent input.

In another embodiment, the processing unit may be further configured to determine tactile feedback information based on the mixed reality environment. In this regard, the user device may further include a tactile structure configured to produce tactile feedback corresponding to the mixed reality environment. The tactile feedback information may be determined in response to the simulated manipulation of the immersive representation of the physical environment in the mixed reality environment.

In another embodiment, the real-world event is a live event. In some cases, the real-world event occurs in a programmed time window.

In another embodiment, the system further includes a database communicatively coupled with the processing unit over the distributed network. The database includes data elements characteristic of one or both of the real-world event or a user associated with the user device.

The data elements may be used in a variety of manners. For example, the data elements may include information associated with a physical location of the real-world event. In this regard, the processing unit may be further configured to: (i) retrieve the data elements over the distributed network; and (ii) associate the group of capture devices with the real-world event based on the detected position of the group of capture devices and the physical location of the real-world event. Additionally or alternatively, the data elements may include information associated with participants of the real-world event. As such, the virtual elements of the mixed reality environment may include a virtual representation of the information associated with the participants. Additionally or alternatively, the data elements may include a profile of the user of the user device. In this regard, the processing unit may be further configured to customize the virtual elements based on the profile. In some cases, the virtual elements may include a virtual representation of the user in the mixed reality environment. Additionally or alternatively, the virtual elements may include a virtual representation of previous interactions of the user with the mixed reality environment.

In another embodiment, the position sensor may be one of a group of position sensors. In this regard, each of the group of position sensors may be associated with a corresponding one of the group of capture devices.

In another embodiment, the system may be further include a second user device communicatively coupled with the processing unit over the distributed network. The second user device may include a display configured to depict the mixed reality environment, such as that modified by the input of the first user device. Further, the second user device may include an input device operatively coupled with the display and configured to detect input in response to a depiction of the mixed reality environment. In this regard, the processing unit may be further configured to modify the mixed reality environment in response to the input of the second input device. The display of the first user device may be configured to depict the mixed reality environment, such as that modified by the input of the second user device.

In another embodiment, in a first mode, the display of the user device is configured to depict the mixed reality environment from a point of view of a first of the group of capture devices. Correspondingly, in a second mode, the display of the user device is configured to depict the mixed reality environment from a point of view of a second of the group of capture devices. The processing unit may be further configured to alternate between the first mode and the second mode based on the input of the input structure.

The present disclosure further includes a method of generating a mixed reality environment of a live event for a remote user. The method includes accessing information associated with a physical location of the live event from a remote database over a distributed network. The method further includes automatically receiving a position of each of a group of candidate live event devices in substantial real-time, each of the group of candidate live event devices having a camera configured to capture scenes from a physical environment and an antenna configured to transmit captured scenes over the distributed network. The method further includes associating a subset of the group of candidate live event devices with the live event based, at least in part, on the physical location of the live event and the received positions. The associated subset defines a group of live event devices. The method further includes generating an immersive representation of a physical environment of the live event using scenes captured from at least a first live event device and a second live event device. Each of first live event device and the second live event device are from the group of live event devices. The method further includes generating a mixed reality environment by modifying the immersive visual representation of the physical environment with virtual element. The method further includes causing a user device associated with the remote user to: (i) in a first mode, depict the mixed reality from a point of view of the first live event device; and (ii) in a second mode, depict the mixed reality from a point of view of the second live event device.

The present disclosure further includes a system for generating a mixed reality environment of a live event for a remote user. The system includes a processing unit. The system further includes a memory coupled to the processing unit. The memory is for storing instruction which, when executed by the processing unit, causes the processing unit to determine a first mobile device is a live event device based, at least in part, on a position of the first mobile device during a programmed time window. The instructions may further cause the processing unit to determine a second mobile device is a live event device based, at least in part, on a position of the second mobile device during the programmed time window. The instructions may further cause the processing unit to receive scenes of a physical environment, the scenes captured by both the first mobile device and the second mobile device. The instructions may further cause the processing unit to access a remote database having data elements that are characteristic of one or both of the live event or the remote user. The instructions may further cause the processing unit to generate a mixed reality environment of the live event based on each of: (i) the scenes captured by the first mobile device; (ii) the scenes captured by the second mobile device; and (iii) the data elements of the remote database. The instructions may further cause the processing unit to transmit a signal including information of the mixed reality environment to a user device.

To illustrate, another embodiment of the present disclosure includes a process/system and method for allowing a user to autonomously/automatically place themselves into a broadcasted live event where they can automatically interact, control, watch and experience the event as if they were physically there based on augmented reality/virtual reality/mixed reality/artificial intelligence (collectively referred to herein as "Mixed Reality Immersive" and/or "MRI Platform". Broadcasting at least part of a IP-based live event with the MRI Platform will allow a user to experience the live event in an enhance experience. Furthermore, the mixed reality immersive can be categorized as having, being, and/or containing at least a tactical immersion, strategic immersion, narrative immersion, or spatial immersion component and/or technique and/or operation as an example, but not limited of immersion experience. In addition, the user is in possession of at least one smart device and/or internet of thing device and/or internet of everything device (collectively referred to herein as "smart device") and/or user device/personal mobile device capable of having mixed reality immersive features based on hardware and/or software, which a user may own or not own, and where user could be physically located anywhere in the world (including the active live event location).

Another embodiment of the present disclosure includes providing consumer/end-user/user the option to be able to automatically select where (location/placement) they would like to established as a mixed reality immersive initial location/placement within an active live event. Additionally, a user may be allowed to move around the live event to fully experience the event from different locations or from a combination of locations within the mixed reality immersive environment. Alternatively, a user may be placed in a default mixed reality immersive location/placement to establish a presence at the live event before being able to move to another location within the mixed reality immersive environment.

Another embodiment of the present disclosure includes providing consumer/end-user/user the option to be automatically and/or autonomously immersed within the broadcasted mixed reality immersive environment/scene where the user may be able to use at least one of their human/user senses such as sight, hearing, taste, smell, touch or any other multitude of senses/sensors that a user may possess as an example. Additionally, the human/user senses may be exteroceptive, and/or proprioceptive and/or interoceptive senses and/or any non-traditional senses such as but non-limited to equilibroception, thermoception, proprioception, or nociception senses as example, which may be used within the broadcasted mixed reality immersive environment and/or outside the broadcasted mixed reality immersive environment to further enhance the user experience.

Consumer/end-user/user may opted-in through a third party application (app) which may be already installed on their personal mobile device or they may be required to download and install a third party app before smart device is capable of providing an mixed reality immersive environment. In addition, the broadcasted mixed reality immersive environment/scenes may be managed, created, modified, updated, deleted, or controlled by software and/or hardware owned or not owned by the user, broadcasting company and/or a third party (or any combination of ownership). Alternatively and/or Additionally, consumer/end-user/user may be required to install app on their personal mobile device which will allow the consumer/end-user/user to display the broadcasted mixed reality immersive environment/scene information on a smart device or have the broadcasted mixed reality immersive environment/scene information push to their user device/personal mobile device and/or have it remain on the smart device in their native language.

Another embodiment of the present disclosure includes providing a fulfilling enhanced user experience to the consumer/end-user/user by having a mixed reality immersive seamless integration between the user and broadcasted live event. When a broadcasted mixed reality immersive connection is made; and the user is automatically seated, walking, standing, or interacting at the live event virtually, the consumer/end-user/user/player enhanced experience is fulfilling. Seamless integration happens when a consumer/end-user/user in possession of at least one user device communicates with other smart device, where communication example could be, but not limited, as cellular, Wi-Fi, Bluetooth, NFC (near field communication), Beacon, RFID, Ultra-sonic, or any other network communication system, which will allow connectivity between all the smart devices. Connectivity may require that a user device(s) and smart device(s) to have an IP Address as a unique identifier or another form of a device unique identifier so that all devices can communicate with each other. Connectivity may require that such smart device(s) and/or user device(s) or broadcasting/third party device(s) to be turned on (having power) prior to connection.

Another embodiment includes a "virtual player mode" that is used by the user to interact with a broadcasted mixed reality immersive scene/environment. Player modes comprises of at least a full virtual player mode, partial virtual player mode, and a basic virtual player mode. Whereas full virtual player mode within the mixed reality immersive environment allows a player to virtually interact with the physical live event such as allowing a "virtual player" to tackle/touch an existing real player or pushing a player out of bounds as an example which may have an impact on the live event outcome. Partial virtual player mode within the mixed reality immersive environment allows a player to interact with the physical live event virtually such as chasing after a real existing player or catching a baseball in a virtual/augmented world as an example without having any impact on the live event outcome. Basic virtual player mode within the mixed reality immersive environment allows a player to interact within the physical live event virtually such as selecting a live event point of view for the consumer/end-user/user/player such as a spectator point of view which may be from a stadium/seating point of view and/or a field/stage point of view where user may be on the field of play/stage or sideline. User may select one or a combination of virtual player modes. In addition, each virtual player mode may have specific allowed user interaction functions which may or may not be active within other virtual player modes. However, both full virtual player mode and partial player mode contain the functionality of the basic player mode.

Another embodiment includes facilitating interaction with the broadcasted mixed reality immersive environment based on virtual player mode(s) selected by a user which such interaction functions may encompass but is not limited to talking, walking, running, skipping, turning around, catching, shooting, pushing, reading, speaking and listening, waving, gesture movement, motioning or any other body movement or a combination of interaction function(s) as an example. Interaction function(s) may also include human/user senses. Wherein, the user interaction may provide the user with an automatic response/reaction from the user initial interaction/action. In addition, a user may be the secondary controller of such interaction within the broadcasted mixed reality immersive environment while the broadcasting company and/or third party may be considered as a primary controller of the mixed reality immersive environment and whereas the primary controller may have or set restrictions on where the user may be located and/or placement and/or interact functions within the active live event. Alternatively, a user located within a broadcasted mixed reality immersive environment may interact with other users located in the broadcasted mixed reality immersive.

Another embodiment of the present disclosure includes providing a process/system and method for allowing a user in possession of at least one user device to autonomously and/or automatically place themselves (virtually) into an active live event where they can automatically interact, control, watch and experience the event as if they were physically at the live using mixed reality immersive component/technique/technology and wherein the user uses at least one component/technique/technology or a combination to have a fulfilled enhanced user experience at a live event. In addition, the user is in possession of or in proximity to at least one user device capable of having mixed reality immersive features based on hardware and/or software, which a user may own or not own and where the user can point the device at the live event action which will then will display/output the view point from field of play and/or stage level on the device controlled by the user. Alternatively, the user device controlled by the user may be pointed at any location within the live event to see the live event action from that point of view (mobile MRI Platform).

Another embodiment of the present disclosure includes providing a system and method for allowing a broadcasting/third party device and/or broadcasting entity/third party entity to automatically monitor and/or track one or more consumer/end-user/user/player mixed reality immersive data element(s) (either all or partial) from an active live event while consumer/end-user/user/player is active in the broadcasted mixed reality immersive environment/scene and/or at the live event. Example of data elements may be (and not limited) as personal information/identification, user device used/identification, GPS coordinates, event identification, date/time, virtual player mode(s), user interaction, or human/user senses. Broadcasting/third party may collect, use, analyze, report, disseminate, augment/merge, save, sell, lease, lend, provide, and give user mixed reality immersive data as an example of data usage. Additionally, data elements may be stored (e.g. local device, remote device, and cloud device) as a data mining element which certain data elements may be available to the user for future mixed reality immersive use. Furthermore, the broadcasting entity/third party entity may use the MRI Platform data for performance measurement, predictive modeling, product enhancement, marketing, promotional, brand awareness campaign, or future event as an example. Alternatively, consumer/end-user/user/player may opted-out of MRI Platform data element tracking.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form described in the accompany drawings. Attention is called to the fact, however that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

DETAILED DESCRIPTION OF THE INVENTION

Figure 1:
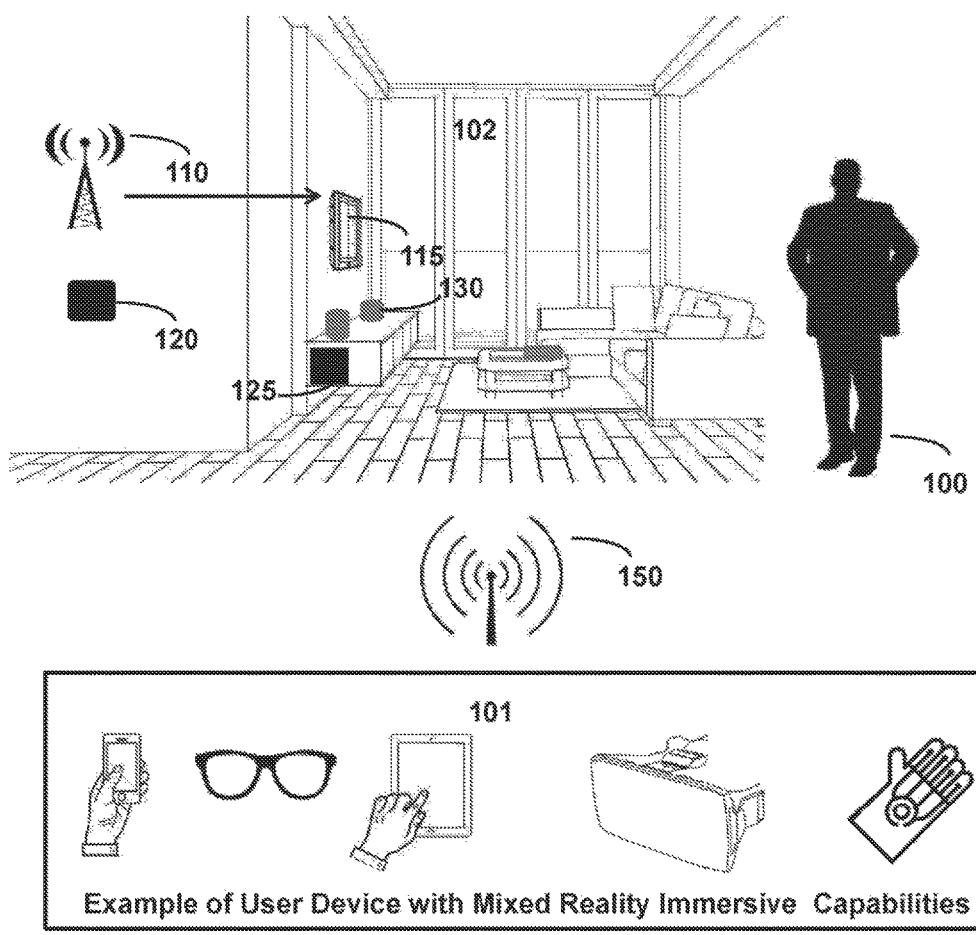
FIG. 1 illustrates a diagrammatic perspective view of one embodiment of a remote location having a smart device, user, and user device, in accordance with the present disclosure.

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to autonomously and/or automatically customizing a broadcasted mixed reality immersive environment or scene of a real-world event, including an active live event. According to the embodiments described herein, a system including multiple capture devices, a remote processing unit, and a user device may cooperate to simulate the manipulation of an immersive representation of a physical environment of the real-world event. This may allow a user to "control" the user experience of a real-world event, such as an active broadcasted live event, by using augmented reality/virtual reality/mixed reality/artificial intelligence (collectively referred to herein as "Mixed Reality Immersive" or "MRI Platform") or any other type of immersive reality which would allow at least one user to be "virtually" placed within an active broadcasted live event such as in the bleacher/stands/stadium and/or on the playing field/stage and allowing a user to control movement and/or any other user interaction. Allowing a user to become an autonomously mixed reality immersive player or spectator within an active live event provides for an enhanced user experience of a broadcasted live event and/or mixed reality immersive environment/scene.

As described herein, an MRI Platform may be a system, including various combinations of processing units, databases, networks, and so on, that cooperate to form a visual representation (e.g., mixed reality environment) that may be a three-dimensional (3D) representation of a real (e.g., physical) or simulated world. The mixed reality environment generated by the MRI platform may be display on two-dimensional (2D) devices such as a computer screen, mobile device, or other suitable 2D display. The mixed reality environment may also be displayed using 3D, such as a 3D display or hologram. Examples of mixed reality therefore may include virtual reality (VR), augmented reality (AR), and traditional 3D representations on a 2D display. Mixed realty immerses users in environments that are either partially or entirely simulated. In mixed realty environments, users interact with real world information using sensors, thereby providing a partially simulated environment. Mixed reality environments may therefore have objects that are simulations or otherwise correspond to real world items, objects, places, peoples, and so on. The objects or conditions in the mixed reality environment may also be used provide feedback, such as haptics, sounds, or the like.

As used herein, an "event" may be substantially any assembly of participants and/or spectators that assemble in the real or physical world. In some cases, this real-world or physical event may be a live event that a remote user may experience in substantial real-time, using the systems and methods described herein. The system of the present disclosure may be configured to capture scenes (including images, movies, audio inputs, and so on) from the real-world event, and generate a mixed reality environment based on the captured scenes that may be manipulated by the remote user. For example, capture devices, such as portable electronic devices or other electronic devices having a camera may capture scenes from the real world event. A remote processing unit may receive these captured scenes and generate an immersive representation of a physical environment of the real-world event. For example, the remote processing unit may combine scenes from two of more of the group of capture devices using a position of the devices (such as that detected by a position sensor of the system) in order to form a three-dimensional representation of the real world.

The immersive representation of the physical environment may be enhanced, modified, augmented, or the like with virtual elements to form a mixed reality environment. Virtual elements may include, or be representative of, data elements relating to participants, spectators, implements (e.g., a game ball, concert equipment, and so on), and/or other information of the real-world event, as described herein. The virtual elements may also include or be representative of a profile of the remote user, or other users, among other possibilities.

A user device associated with the remote user may receive information of the mixed reality environment and display the mixed reality environment at a display. The user device may include one or more input structures or sensors that are configured to detect input in response to a depiction of the mixed reality environment, including touch input, force input, gestures, and/or voice commands. The processing unit may use this input of the user device to modify the mixed reality environment. This may involve generating a constructed asset in the mixed reality environment that simulates manipulation of the immersive representation of the physical environment. The constructed asset may include simulated graphical objects associated with the real-world event. Sample constructed assets may be representative of a game ball, a participant in the real-world event, and/or substantially any other feature of the real-world event. Inputs detected at the user device may be used to modify the constructed asset, thereby allowing the processing unit to generate a mixed reality environment that allows the user to experience manipulation of the real-world event, including manipulation of a live event when the real-world event occurs in substantial real-time.

As a non-limiting illustration, the real-world event may be a football game. Capture devices may be mobile phones of spectators that capture scenes of the football game. It will be appreciated that, as described herein, capture devices may be substantially any electronic device configured to capture scenes of the real-world event, including various standalone digital cameras, broadcast television cameras, including stationary or fixed cameras, and so on. Continuing this illustration, the mobile phones may capture the scenes of the football game from distinct points of view, for example, corresponding to a position of each capture device. The processing unit may generate the immersive representation of the physical environment of the football game using the captured scenes from at least two capture devices and the position of each. This immersive representation of the physical environment of the football game may be a three-dimensional representation that allows a remote user to experience the football game from at least the point of view of the two capture devices.

The immersive representation of the physical environment may be used to generate a mixed reality environment using virtual elements. Continuing the non-limiting illustration, the mixed reality environment may include virtual elements that depict information concerning performance attributes of one or more of the participants of the real-world event. In some cases, the virtual elements may prompt the remote user to interact with the mixed reality environment. The user device may display this mixed reality environment to the user and detect input from the user associated with the mixed reality environment. For example, the user may perform one or more gestures based on the mixed reality environment (e.g., a user may perform a push gesture in response to an advance of a football player in the mixed reality environment). In turn, the processing unit may modify the mixed reality environment in response to the detected input. This may involve generating, by the processing unit, a constructed asset, in the mixed reality environment, that simulates manipulation of the immersive physical representation of the physical environment (e.g., the three-dimensional scenes from the real-world event), based on the detected input. In this illustration, a constructed asset may be generated that simulates a football player from the real-world event being pushed in response to a detection of the push gesture from the use of the remote user device.

To facilitate the foregoing, the MRI Platform, as described herein, may be customized by stored user data elements (e.g. locally and/or remotely) and/or may be customized by user current interaction with the broadcasted MRI Platform which may be in response to a human/user senses interaction/reaction. For example, the data elements may include information corresponding to one or more of a physical location of the real-world event, participants of the real-world event, one or more profiles of a remote user, including a virtual representation of the remote user, among various other possibilities. The proposed systems and methods herein provide improvements to the third party devices themselves as well as improvements to the interaction between user, user device, and third party devices and/or application which enhances the broadcasted live event user experience.

Reference will now be made to the accompanying drawings, which assist in illustrating various features of the present disclosure. The following description is presented for purposes of illustration and description. Furthermore, the description is not intended to limit the inventive embodiments to the forms disclosed herein. Consequently, variations and modifications commensurate with the following teachings, and skill and knowledge in the art, are within the scope of the present inventive embodiments.

FIG. 1 illustrates a consumer/end-user/user/player (person) 100 in possession of at least one user device 101. The user 100 and user device 101 may be located within a remote location 102 (such as FIG. 2 and FIG. 4) which may be in a private, semi-private, semi-public, or public habitation and/or temporary habitation setting and which may or may not be owned by the user 100. Examples of remote location 102, include, but are not limited to, a private residence, non-private residence, a restaurant, a bar, a hotel/motel, an airport, a train, a plane, a vehicle (autonomous or non-autonomous). In some cases, the remote location may be all or partially within an indoor, outdoor, or a combination environment setting. The remote location 102 is capable of accommodating one or more user 100 having at least one user device 101 and remote location may be equipped with at least one or more smart device 115 which is capable of receiving displaying/outputting a live broadcasted event 110 (such as FIGS. 2 and 3), and/or a broadcasted mixed reality immersive environment/scene on user device and/or remote smart device. In addition, communication 150 between at least one user device 101 and at least one smart device 115 further enhances the user experience by displaying/outputting or allowing the user to interact with the live event based on mixed reality immersive hardware and/or software installed on at least one user device 101 and/or at least one smart device 115.

FIG. 1 also illustrates examples of a user device 101 which is not limited but may include a smart mobile device, a tablet, a laptop, a headset, glasses, or smart wearable (e.g. gloves, shoes, clothing) as an example that a user 100 may be in possession of and which are capable of performing partially or fully mixed reality immersive activity/interaction. Accordingly, the user device 101 may include a communication device, such as an antenna, that may be configured to receive signals from the remote processing unit including information of the mixed reality environment over one or both of a distributed network or a local connection. The user device 101 may also include a display and/or other visual components or systems that may be used to depict the mixed reality environment to the user 100, including a three-dimensional representation such as hologram.

Additionally or alternatively, the user device 101 may include one or more tactile structures, including piezoelectric and/or other actuators, that may be used to provide tactile feedback to the user 100 based on tactile feedback information of the mixed reality scene, thereby contributing to the immersive experience. To illustrate, the tactile feedback information may be based on an advance of a football player toward the user, thereby causing the user device 101 to produce tactile feedback, such as a vibration that simulates the advances of the football player. The user device 101 may also include, or be coupled with, an input device that is configured to detect input from the user 100. The input detected by the input device may be one or more of a touch input, a force input, a gesture input, and/or a voice command. As such, the user 100, according to the systems described herein, may at least partially control the depiction of the mixed reality environment using the input detected by the input device of the user device 101.

A user may use one or more user device(s) with a combination of user selection, user interaction and with consumer/end-user/user using at least one human/user senses to provide a customized and enhanced user experience of a live event and/or broadcasted MRI Platform. In addition, the user device may require software and/or hardware to be installed/configured before mixed reality immersive is capable and/or hardware and/or software may be pre-installed as a default or require that the user 100 to adapt/modify the user device 101 after purchase. A smart device 115 may be a television (or any other type of visual display), audio component 130, appliances, touch sensor device, or any other smart device as example, but not limited, that is capable of allowing a user to use at least one human/user senses and/or at least one interaction during a live event and/or broadcasted MRI Platform. When user leaves the vicinity/proximity of the smart device, the smart device may change back to a device default state FIG. 1 also illustrates the user device 101 can communicate with at least one smart device 115 by a communication module/application as example through proximity (e.g. via a wireless protocol such as Wi-Fi, Bluetooth, or NFC) and/or a direct physical contact between user device 101 and smart device 115 by a wired connection or any other network communication protocol that is available. Communication between the user device 101 and the smart 115 may be controlled/monitored by a network device/hub 120.

FIG. 1 also illustrates the broadcasting 110 of the live event to the smart device 115 may require a monitoring/controlling device 125 which may be a router, cable box, media play, or game console or a combination as an example, but not limited. Optionally, the monitoring/controlling device 125 may be used for the broadcasted mixed reality immersive environment/scene (MRI Platform) (such as 202 in FIG. 2 and FIG. 3) and/or may also be used to control user placement (spatial location) within the broadcasted MRI Platform such as field point of view (such as 203a in FIG. 2 and FIG. 4) or spectator point of view (such as 203b in FIG. 2 and FIG. 4).

Figure 2:
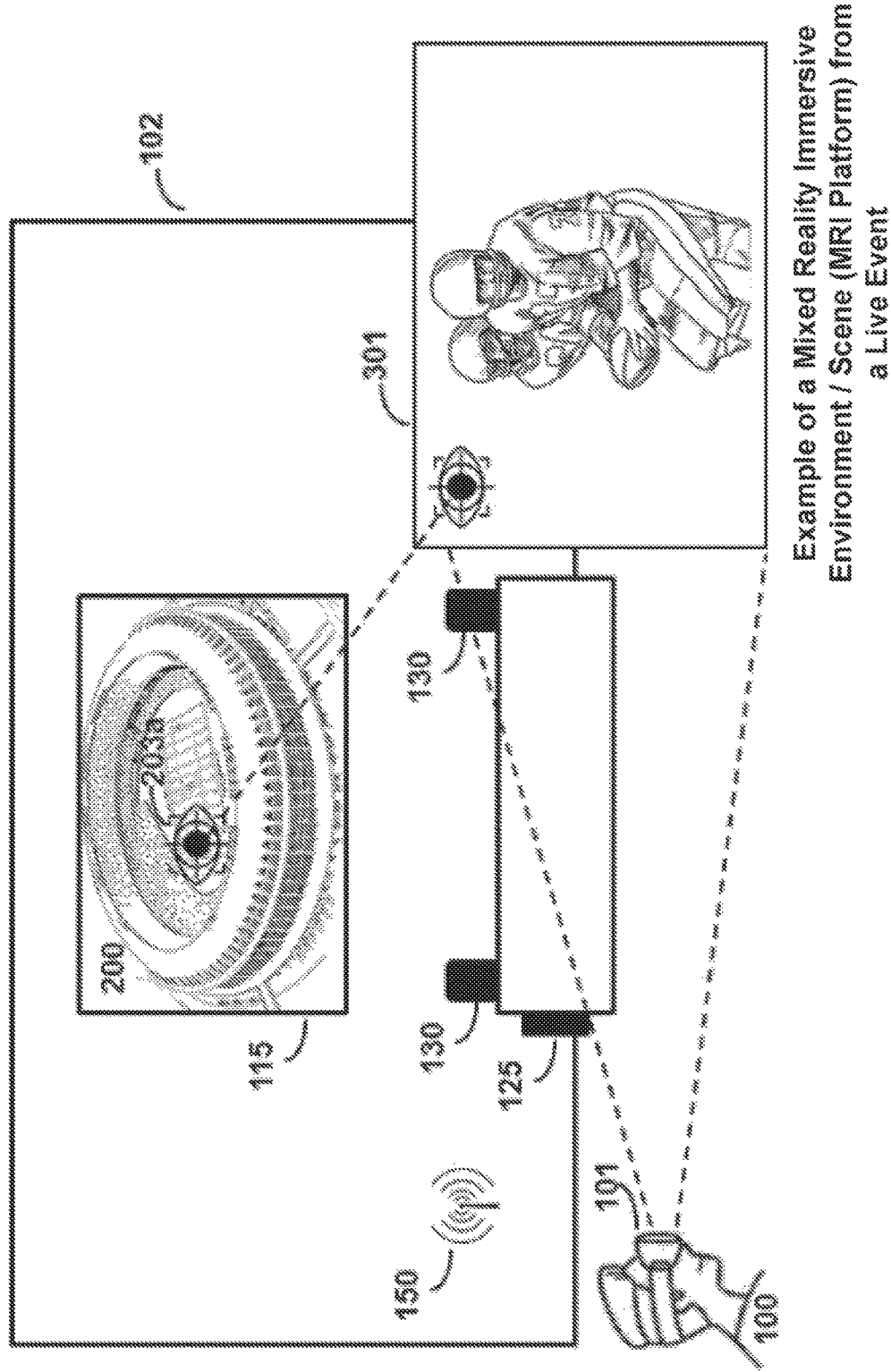
FIG. 2 illustrates a diagrammatic perspective view of one embodiment of a user within a remote location using a user device and experiencing a broadcasted mixed reality environment/scene (MRI Platform), in accordance with the present disclosure.
Figure 4:
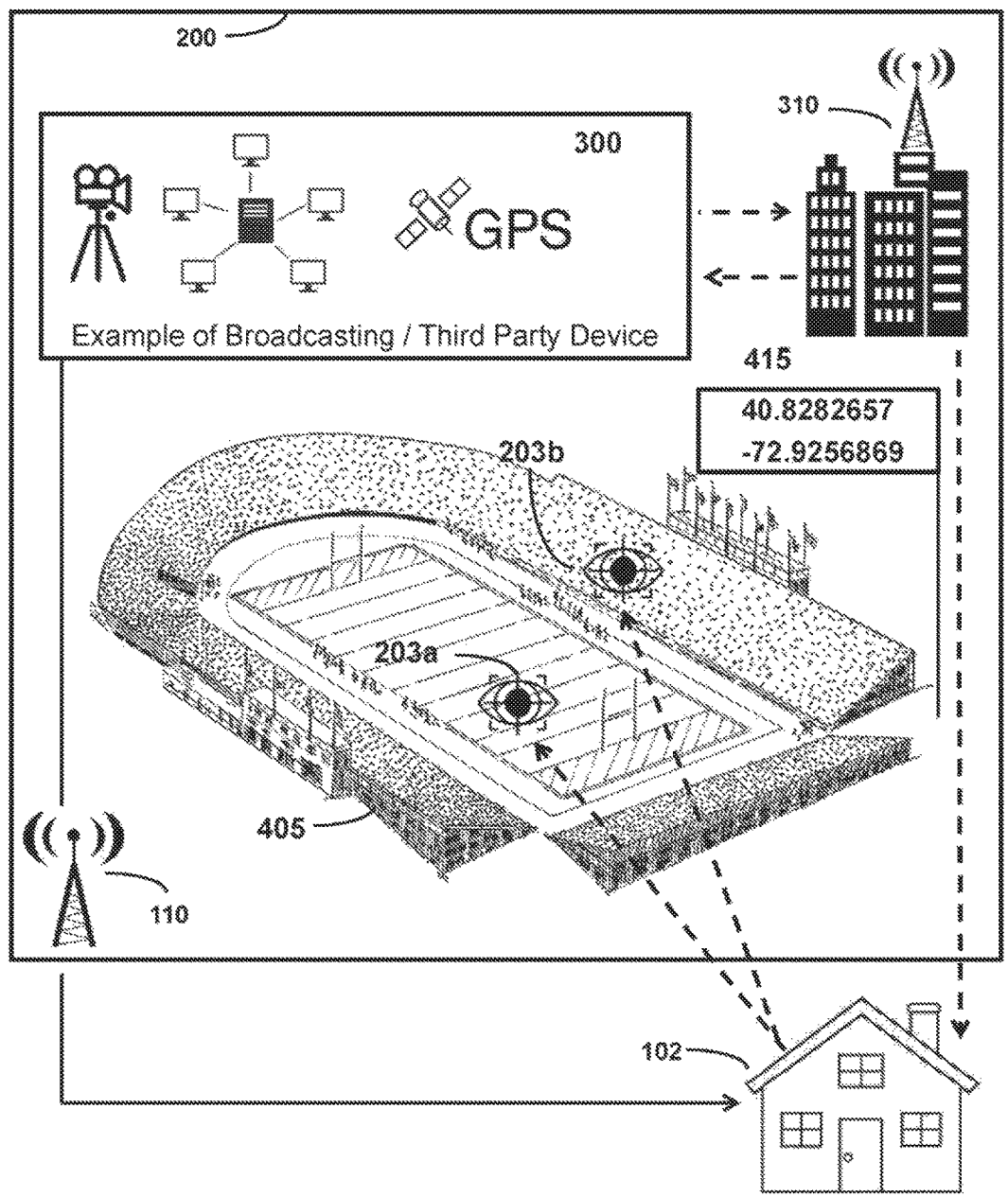
FIG. 4 illustrates a diagrammatic perspective view of one embodiment of an active live event being broadcasted to a remote location by using broadcasting and/or third party devices and whereas the active live event has at least one GPS coordinate system mapped to the physical location, in accordance with the present disclosure.

FIG. 2 illustrates a user 100 in possession of a user device 101, experiencing the broadcasted mixed reality immersive environment/scene (MRI Platform) 301 from a live event 200 which is broadcasted to a smart device 115. The mixed reality scene 301 may include the immersive representation of the physical environment, such as a three-dimensional representation of the real-world event generated from multiple capture devices at the event. The mixed reality scene may also include various constructed assets that are generated and/or modified in response to input detected at a remote device and that are used by the remote processing unit to simulate manipulation of the immersive representation of the physical environment. In the illustration of FIG. 4, the constructed assets may be a football player, a football, and/or other graphical objected associated with the live event 200. In this regard, the constructed assets, while based on or derived from physical scenes from the live event 200, may be partially or wholly simulated based on the detected input, thereby facilitating an interactive experience with the real-world event in the mixed reality environment.

Accordingly, the user 100 is capable of interacting/controlling events within the broadcasted MRI Platform through voice command, hand selection, motion (e.g. head, body, eyes, hand, and feet) as an example, but is not limited. For example, a remote user device (e.g., user device 101 of FIG. 1) may detect various characteristics of the input, such as a magnitude, a direction, a position, a volume, a speech pattern, and so, and the remote processing unit may use this detected input to modify the mixed reality environment, including generating or modifying the constructed asset in order to simulate manipulation of the immersive representation of the physical environment. In addition, a broadcasted MRI Platform "point of view" may be selected by a user such as the field point of view 203a for example, and user may change point of view throughout the broadcasted MRI Platform. Additionally, the broadcasted live event 200 displayed/outputted on the smart device 115 may have a different scene (visual display) then what is shown in the MRI Platform that the user is interacting with and/or the smart device 115 may be used to initiate/activate the MRI Platform when user device is within proximity or when user makes a gesture (e.g. points, hold up, or motion) with the user device in the direction of the smart device. Alternatively, the smart device 115 may allow for a picture-in-picture and display/output (e.g. alongside, on top of broadcasted live event) to display both live event and the MRI Platform (not shown).

FIG. 2 also illustrates that the broadcasting of live event and/or mixed reality immersive environment/scene is a one-to-many and/or many-to-many environment. Additionally, the live event may be within a habitation setting/environment which may be a private habitation, semi-private habitation, semi-public habitation, and public habitation as an example, but not limited and habitation setting may be a temporary habitation setting and/or permanent habitation setting for broadcasting live event(s).

Figure 3:
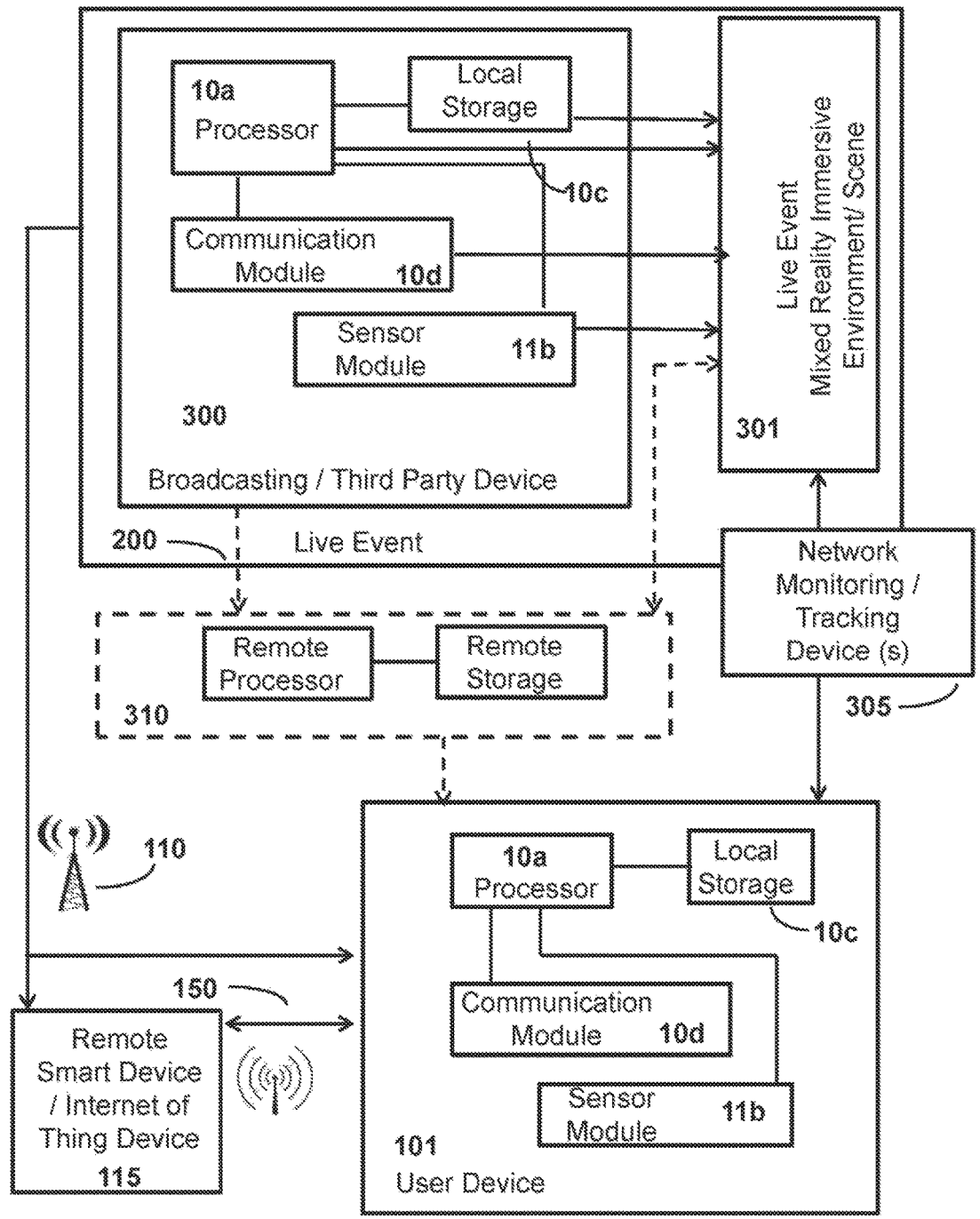
FIG. 3 illustrates one embodiment of a system for customizing at least one live event mixed reality immersive (MRI Platform) by a user in possession of a user device in accordance with the present disclosure.
Figure 5:
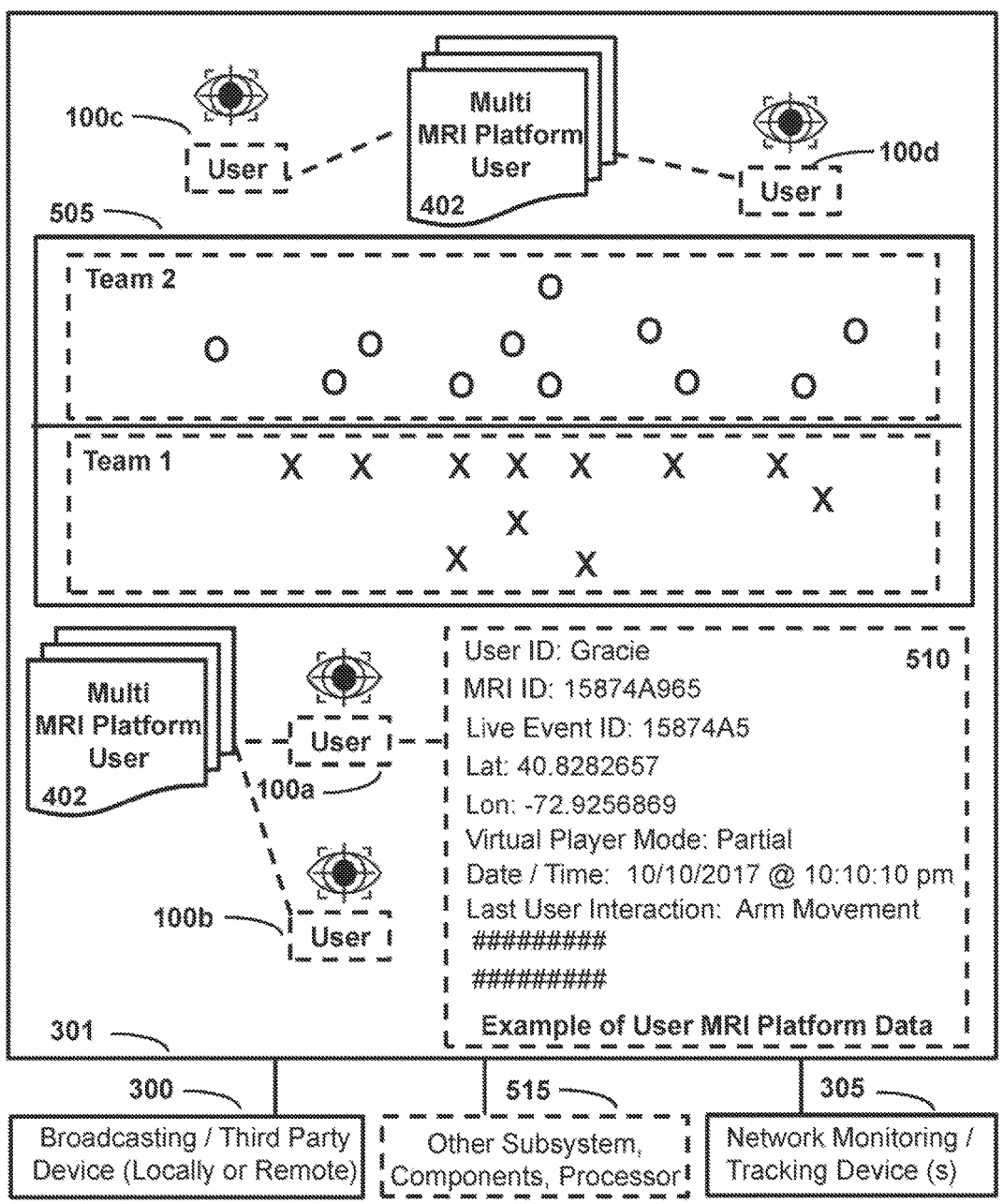
FIG. 5 illustration a diagrammatic perspective view of one embodiment of at least one user in possession of at least one user device located within a broadcasted mixed reality immersive environment/scene which is controlled, monitored, tracked, created, or modified as example by a broadcasting/third party device(s) which may be owned by a broadcasting entity and/or a third party entity.

FIG. 3 is a schematic view of an illustrative of an active live event 200 having at least one capture device, such as a broadcasting/third party device 300 shown in FIG. 3. The broadcasting/third party device 300 is used for broadcasting of live event 200 and/or to create, manage, broadcast, monitor as an example, but is not limited, a mixed reality immersive environment/scene 301 which may be networked monitored by a network monitoring/tracking device 305 (as shown in FIG. 5 also). Broadcasting/third party device 300 is further used to facilitate the broadcasting of the live event 110 internally (locally) and/or externally to a remote smart device 115 and/or directly to a user device 101 or a combination. Remote smart device 115 communicates with at least one user device for at least sending/receiving data by using at least one communication protocol.

In some embodiments, at least one user device communicates with the broadcasting/third party device 300 of the mixed reality immersive environment/scene 301. Broadcasting/third party device(s) 300 may comprise of several components such as, communication modules 10d, software (e.g., 13b1, 13b2, 13bN of FIG. 13), processor 10a, storage (memory) 10c, sensor module 11b, input/output 10b as an example, but is not limited. The user device(s) 101 may comprise of several components such as, communication modules 10d, storage (memory) 10c, processor 10a, storage (memory) 10c, sensor module 11b, input/output 10b, software (e.g., mixed reality immersive application, email application, messaging application, media player, or viewer application) 13b1-13bN as an example, but is not limited. In some embodiments, one or more than one of the broadcasting/third party device 300 and/or user device and/or smart device components may be combined or omitted such as, for example not including the communications interface. In some embodiments, the broadcasting/third party device 300 and/or the user device 101 may comprise other components not combined or comprised in those shown in FIG. 3. For example the broadcasting/third party device 300 may comprise a power subsystem. In other embodiments, the broadcasting/third party device 300 and/or user device and/or smart device may comprise several instances of the components shown in FIG. 3. For example, the broadcasting third party device 300 and/or user device 101 may comprise multiple memory subsystems. For the sake of conciseness and clarity, and not limitation, one of each of the device/components is shown in FIG. 3.

To illustrate, one or more of the broadcasting/third party device 300, the user device 101, and/or another device associated with the live event 200 may include a position sensor. Broadly, the position sensor may be configured to detect a position of the respective device. In an embodiment, the position sensor may be configured to detect a position of the broadcasting/third party device 300. As descried herein, the remote processing unit may use the detected position of the broadcasting/third party devices to generate the immersive representation of the physical environment of the live event 200. For example, the processing unit may combine scenes captured by the broadcasting/third party devices based on the detected position of each device in order to generate a three-dimensional representation of the real world.

In some embodiments, the position sensor may be a sensor of the sensor module 11b shown in FIG. 3; however, this is not required. It will be appreciated that the position sensor may include or be associated with substantially any hardware and/or software that is used to determine information related to an environmental condition of the device. Sample components include, without limitation, one or more accelerometers, gyrometers, inclinometers, goniometers, or magnetometers, proximity sensors, such as a magnetic hall-effect sensor, inductive sensor, capacitive sensor, continuity sensor, or the like. Additionally or alternatively, various wireless positioning devices may be used, including, without limitation, global positioning system (GPS) circuitry, Wi-Fi circuitry, cellular communication circuitry, and the like. Further, one or more optical sensors may be used, including, without limitation, photodetectors, photosensors, image sensors, infrared sensors, or the like.

FIG. 4 illustrates an embodiment of an active live event 200 and/or mixed reality immersive environment/scene (MRI Platform) being broadcasted 110 using broadcasting and/or third party devices 300. While the active live event 200 may be used to generate a mixed reality environment in substantial real time, in other cases the mixed reality environment may be generated after a delay, including after a conclusion of the live event 200. As such, it will be appreciated that any discussion of an active live event 200 may generally be any real-world event, as described herein, and does not require the mixed reality environment be generated and/or manipulated during the active live event 200. Live event and/or mixed reality immersive environment/scene (MRI Platform) may be broadcasted internally (within live event infrastructure) 405 and/or remotely 102 to at least one external infrastructure where at least one user is in possession of at least one user device is watching the active live event. Additionally, the live event and/or mixed reality immersive environment/scene may be broadcasted over airways (e.g. cable station, over-the-air station), internet (e.g. streaming, cloud, remote device), or local (internal) as example, but is not limited, which may be regulated and/or broadcasting of the live event may be facilitated by a remote processing and storing facility/infrastructure 310 (such as FIG. 3) before being sent out to consumer/end-user/user. Alternatively, a user in possession of a user device may be physically located at the live event 405 where they are capable of initiating/activating the broadcasted MRI Platform and participate such as selecting a location within the live event other than their current location (e.g. another spectator point of view, field point of view).

In some embodiments, the live event may be mapped/tagged to a global coordinate system (GPS) such as latitude and longitude coordinate 415 or North and East coordinates as an example, but is not limited. Various locations throughout the live event and/or mixed reality immersive environment/scene (MRI Platform) may have specific GPS coordinates or the entire live event infrastructure (including playing field, stadium, or stage as an example) may be mapped to a GPS coordinates. Furthermore, users, team player(s) or coaches, referees/umpires/linesmen, may be tagged/mapped/monitored with GPS coordinates during live event (including position triangulation) and/or within the MRI Platform and whereas the tagging, monitoring, mapping of GPS coordinates may be done with wearable smart sensor(s)/device(s) which are capable of transmitting and/or receiving data (including position triangulation). In addition, the GPS coordinate system helps facilitate the broadcasted MRI Platform for allowing a user in possession of a user device to be able to select a location such as field point of view or spectator point of view and/or any interaction.

In some embodiments, the live event broadcasting/third party device(s) 300 may be mapped/tagged with GPS coordinates. For example, a capture device, mobile phone, and/or other device having a camera may detect or otherwise be associated with a position having GPS coordinates. In some embodiments, the capture device may be associated with the active live event 200 based on the relative position of the device to the GPS coordinates of the active live event 200. This may help a remote processing unit and/or other system distinguish candidate capture devices, from capture devices that are actual present at the active live event and configured to capture scenes.

The position sensor, described herein, may be positioned at or near the live event 200 and used to detect a position of one or more third party devices. This may be based on the foregoing GPS coordinates; however, in other cases, other position related data may be used. In the illustration of FIG. 4, the position sensor may detect a first third party device at a first point of view 203a and a second third party device at a second point of view 203b. In some cases, multiple position sensors may be used, including systems in which each third party device includes a position sensor; however, this is not required. The remote processing unit may therefore generate the immersive representation of the physical environment of the live event 200 using the scenes captured by the respective third party devices based on the detected position of each device. Moreover, this may also allow a remote user to experience the immersive representation of the physical environment from the first point of view 203a and the second point of view 203b in the mixed reality environment, thereby allowing the user to move around and "explore" the live event 200 from a remote location.

Broadly, broadcaster/third party device 300 may be one or more video server, video camera (fixed location and mobile), cable device, satellite, transponder, audio equipment, converter, monitors, network servers, controller, electrical equipment, network monitoring device/hub, communication module/device, sensor module/device, storage device, or any other broadcasting device as an example. The broadcasting/third party device 300 examples should not be construed as being limited but rather to convey the scope of a broadcaster/third party device. Additionally, one or more broadcasting/third party device(s) 300 and/or component(s) and/or software may be used for broadcasting live event to remote location and/or for creating, monitoring, controlling, or managing the broadcasted mixed reality immersive environment/scenes (MRI Platform).

In some embodiments, the live event broadcasting/third party device 300 and/or user device 101 may automatically generate, collect, share, monitor, or track data elements of user and/or existing player and/or other user and/or coaches, referees, linesmen and/or any other participant of the broadcasted mixed reality immersive environment/scene. These data elements may be used by the remote processing unit to generate virtual elements, such as those used to modify the immersive representation of the physical environment, and/or constructed assets of the mixed reality environment. Such data elements may be a user name, user identification, event identification, GPS coordinate(s) of user, GPS coordinates of event, user device type, user device identification, user personal information, language preference, payment type/method, virtual player mode(s), current interaction, last interaction, and current or last body user senses used as an example of data elements, among various possibilities. Furthermore, data elements may be personal body vitals such as heart rate, breathing rate, blood pressure, or temperature as an example. These data element examples are not to be construed as being limited but rather to convey the scope of the invention. Additionally, either all or partial of the data elements may be analyzed, stored, sold, lease, given away, merged, reported, manipulated, or used for a variety of reasons by the broadcasting entity/third party entity. These data elements may also be used to enhance the mixed reality environment. For example, in an embodiment, the mixed reality environment may include virtual elements based on one or more of the following data elements that are added to and/or otherwise used to modify the immersive representation of the physical environment.

In some embodiments, the stored (locally or remotely) data elements (not shown) may be used by a user to further customize and enhance the user experience within an existing broadcasted mixed reality immersive environment/scene or for a future event. Such stored data elements may also be referred to as user preference such as name, language, payment type/method, birthday, age, favorite team/player, or favorite event type as an example. These user preferences data element examples are not to be construed as being limited but rather to convey the scope of the invention.

Figure 6:
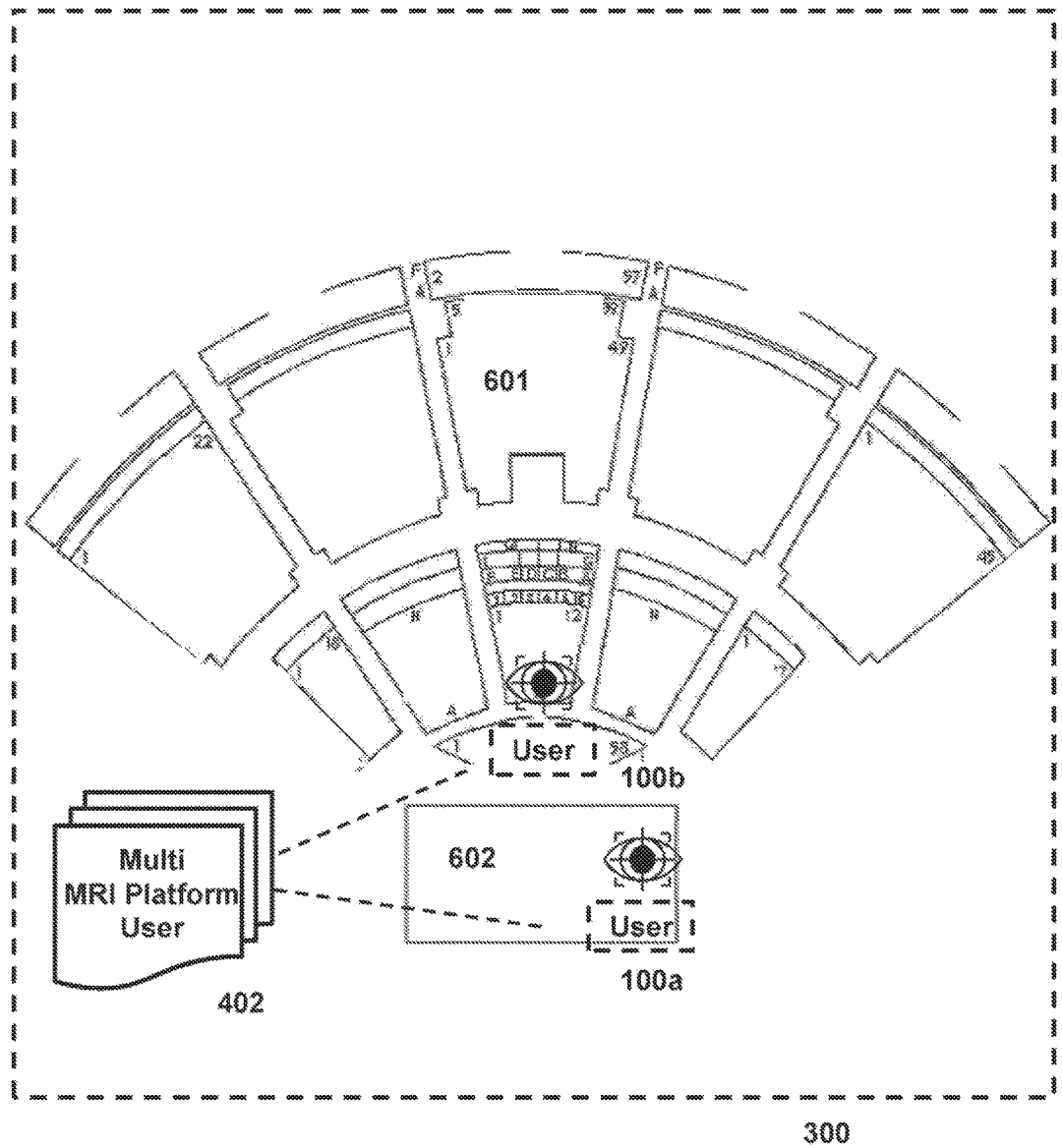
FIG. 6 illustration a diagrammatic perspective view of one embodiment of an active live event such as a concert/theater for example which is capable of accommodating at least one user in possession of at least one user device to physically be located at the event and/or by mixed reality immersion.

FIG. 5 illustrates the embodiment of a broadcasted mixed reality immersive environment/scene 301. The broadcasted mixed reality immersive environment/scene 301 may accommodate one or more consumer/end-user/user/player physically, virtually, or a combination which includes multiple virtual user/player 402 (also in FIG. 6) which comprises of individual user (e.g., 100a, 100b, 100c, 100d) which are associated with at least one user device. User(s) may be located anywhere within the broadcasted mixed reality immersive environment scene 301 as example, but not limited, on a playing field (such as 203a of FIG. 2) which comprises of at least two teams 505, which are further comprised of at least one member of each team within the field of play. An example, but not limited of a live event comprising of at least two teams is a football game, baseball game, soccer game, basketball game, individual Olympic game, horse racing, or automobile racing.

In some embodiments consumer/end-user/user/player are associated with data elements 510 which may be created, modified/updated/deleted, collected, managed, tracked, stored, analyze, reporting, monitored, or manipulated while within broadcasted mixed reality immersive environment/scene. Data elements examples, but not limited, may comprise of user name/id, mixed reality immersive (MRI Platform) identification, live event identification, GPS coordinates, virtual player mode, data, time, user device identification, user interaction, heart rate, human/user senses used or any other acceptable data element. Additionally, data elements may be created, modified/updated/deleted, collected, managed, tracked, stored, analyze, reporting, monitored, or manipulated on any participant of the broadcasted mixed reality immersive environment/scene.

In some embodiments, a networked monitoring/tracking/control hub device 305 (shown in FIG. 5 and step 804 in FIG. 8 also) is configured to control configuration/customization and/or operation of an active live event and/or the mixed reality immersive environment/scene which the network monitoring/tracking/control hub device may be located locally or remotely or a combination of location(s). In some embodiments, the monitoring/tracking/control hub device (305 as shown in FIG. 3) is configured to detect location/placement (including GPS coordinates/position triangulation) as well as collect/disseminate (e.g. sending, receiving, pushing, or pulling), manage/control, or generate data element (including saved preferences) of a user 510 and/or any and other participant within a broadcasted mixed reality immersive environment/scene.

Figure 7:
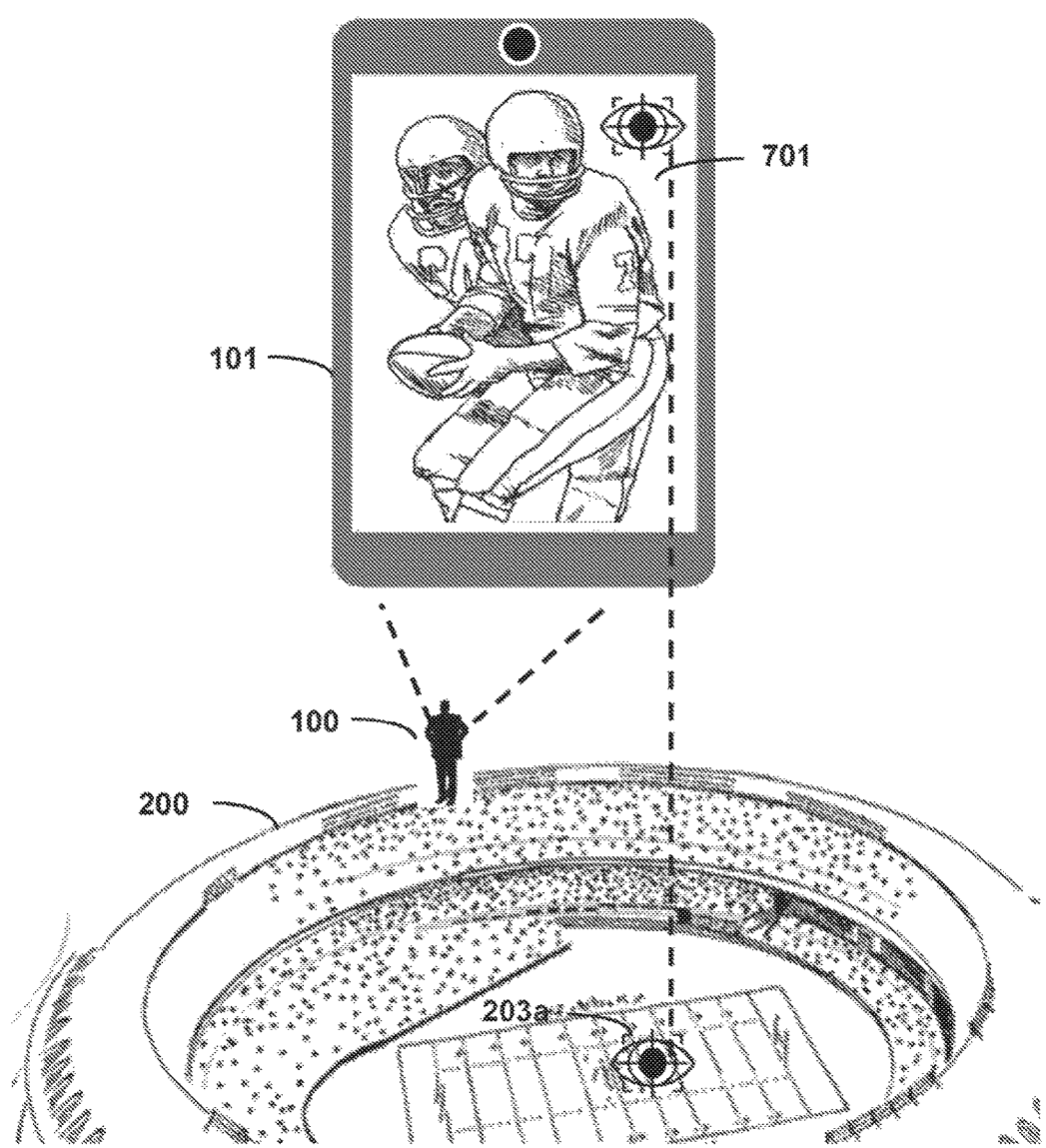
FIG. 7 illustration a diagrammatic perspective view of one embodiment of an active live event such as a sporting event for example which is capable of accommodating at least one user in possession of at least one user device to physically be located at the event while using mobile mixed reality immersive platform.
Figure 8:
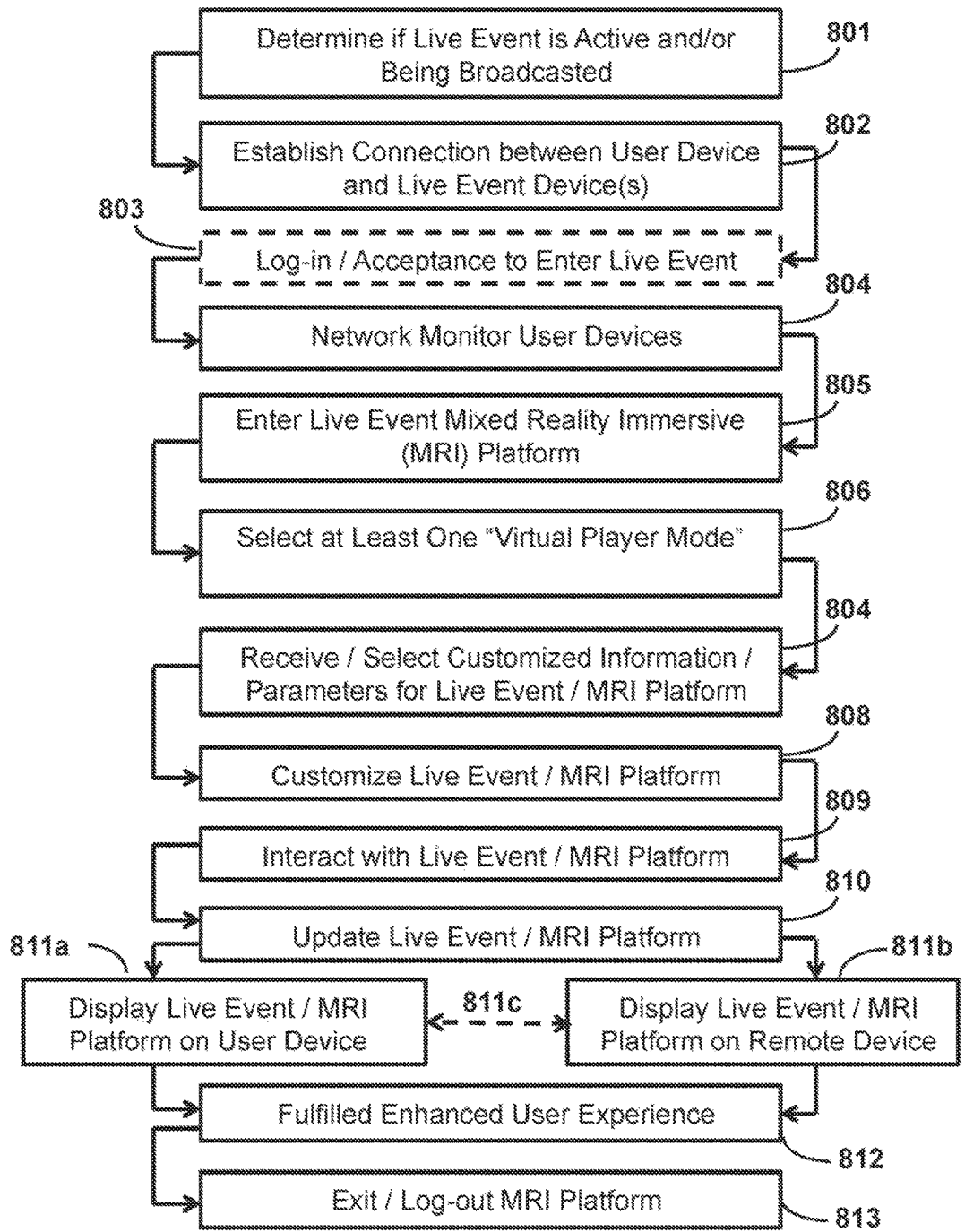
FIG. 8 is a flow diagram, illustrating steps for customizing and interacting with a broadcasted mixed reality immersive environment/scene (MRI Platform) by at least one user, in accordance with an embodiment of the present disclosure.

FIG. 7 illustrates one embodiment of a user 100 in possession of at least one user device 101 physically located at a live event 200. The user 100 may be walking, interacting, seated or standing in a location within the live event. The user 100 in possession of at least one user device 101 establishes a connection (communication) with a broadcasting/third party device to initiate the mixed reality immersive environment/scene on the user device. Once a user has established the connection (802 as shown in FIG. 8), a user 100 may point the user device 101 at any location within the live event to enter (such as 805 in FIG. 8) a broadcasted mixed reality immersive environment/scene 301 which is displayed on the user device 701. The user 100 may interact with the broadcasted MRI Platform (such as 809 in FIG. 8) within the mobile MRI Platform 701. A user physically located at a live even may also be monitored/tracked by a network monitoring/hub device (such as 305 in FIG. 3). Additionally, a user 100 may be a virtual player within a physical field of play (203a as shown in FIG. 2 and FIG. 4) and user may be displayed on a "jumbo" display (visual screen) while interacting with the broadcasted MRI Platform and a user may create data element (such as 510 in FIG. 5) if the user has opted-in (such as 901b in FIG. 9).

FIG. 8 is a flow diagram illustrating one embodiment of a method 800 for automatically customizing an active broadcasted mixed reality immersive environment/scene by a user 100 who is in possession of at least one user device 101. In step 801, a user determines if a live event is active and/or is being broadcasted for a mixed reality immersive event (environment/scene) which is associated with at least one GPS coordinates, and which is broadcasted live event and/or MRI Platform is capable of accommodating at least one user. In some cases, the live event may be a programmed or otherwise scheduled event, and a remote processing unit may access a database to determine programming information of the event, such as a start time or time window of the event. The live event may, in some cases, be organic, spontaneous, or otherwise non-scheduled. As such, a remote processing unit may determine a live event by identifying groups of clusters of candidate live event devices based on a detected position of the devices and/or other information from remote database, including by accessing social media information, which may be identified in substantial real-time.

In step 802, a user established connection between at least one user device 100 and at least one broadcasting/third party device 300. Step 802 may include associating a position of the broadcasting/third party device 300 with a position of the live event. In an optional step 803, a user 100 may have to log-in/authenticate and/or be prompted for an "acceptance to enter" notification before being able to interact/customize a broadcasted mixed reality immersive environment/scene.

In step 804, a network monitoring device may monitor and/or track a user 100 within the live event and/or broadcasted mixed reality immersive environment/scene (MRI Platform) 301. Network monitoring device may also be configured to monitor, collect, generate, receive, or transmit data element 510 of all participants of the broadcasted mixed reality immersive environment/scene (MRI Platform). In step 805, user 101 in possession of at least one user device enters the broadcasted mixed reality immersive environment/scene (MRI Platform) and is ready to interact within the broadcasted MRI Platform. In step 806, a user 101 may select at least one virtual player mode which for example, but not limited to full player mode, partial player mode, or basic player mode. Such player mode(s) 806 may be associated with a paid or not paid (e.g., free, trial period) subscription mode (not shown) and which user subscription mode selection may be stored as a data element and is initiated when user enters the broadcasted MRI Platform 805.

In step 807, a user may receive and/or select customized information/parameters such as broadcasted MRI Platform placement/location or another other acceptable interaction which are available for user. Once user has made a selection of customized parameters/data elements, the broadcasted MRI Platform is customized 808 and ready for user interaction 809. The broadcasted MRI Platform is capable of having multiple users within the same broadcasted mixed reality immersive environment/scene (MRI Platform) with each user having a customized/personalized experience. In step 809, a user interaction may allow as an example, but not limited, a user to use at least one of their human/user senses such as sight, hearing, taste, smell, touch or any other multitude of senses/sensors that a user may. Interaction 809 may be coupled (mixed/combined) to allow a user to use multiple human/user senses as well as other interaction such as body movement (e.g. eye movement, hand movement, leg movement, foot movement, or head movement), audio interaction, and/or any other suitable interaction allowed while in the broadcasted mixed reality immersive environment/scene (MRI Platform). Interaction may also include allowing a user to perform a "replay" (e.g. rewind, fast forward) of a scene, compare scene(s), and/or analyze a scene within the MRI Platform. In addition, a user may be able to interact with other "virtual" users within the MRI Platform as well as any other participant within the MRI Platform and where the interaction level may be controlled, monitored, managed by the user virtual player mode(s) 806 selected.

In step 810, a broadcasted MRI Platform is updated when a user in possession of at least one user device interacts within the broadcasted MRI Platform. Such updating of broadcasted MRI Platform may be for an example, but not limited to a user moving from one location to another (e.g. walking, running, jumping, riding, flying), another "virtual" player enters the broadcasted MRI Platform, and so forth. Additionally, update 810 may happen when the live event is updated which would then create a new mixed reality immersive environment scene. Examples of a live event update, but not limited is during a football game where it is second down and the ball is on the 30 yard line. When team 1 moves the ball from the 30 yard line to the 43 yard line, the live event will be updated to reflect the new location on the playing field. Therefore the live event is now taken place from the updated live broadcasted footage which is controlled, managed, created from at least one broadcasting/third party device(s). In addition, the live event footage may be considered to be the "base" scene within the broadcasted mixed reality immersive environment/scene (MRI Platform) where at least one user in possession of at least one user device has entered the broadcasted MRI Platform which then merges at least the physical and virtual environment together.

In step 811a and 811b, the live event/mixed reality immersive environment/scent (MRI Platform) is displayed on a user device 811a or a remote smart 811b (e.g. television, smart television, kiosk, infotainment device). Display 811a/811b may be updated 810 as live event/mixed reality immersive environment/scene updates and/or progresses. Additionally, the user 811a may communicate 811c with the smart device 811b to display the broadcasted MRI Platform either individually or as a picture-in-picture option. In step 812, a user in possession of at least one user device has a fulfilled enhanced/customized user experience within the broadcasted mixed reality immersive environment/scene (MRI Platform) when they enter the MRI Platform 805 and/or are able to interact 809 within the MRI Platform for the entire or partial broadcasting of the active live event 801 which then a user will exit 813 the broadcasted MRI platform.

Figure 9:
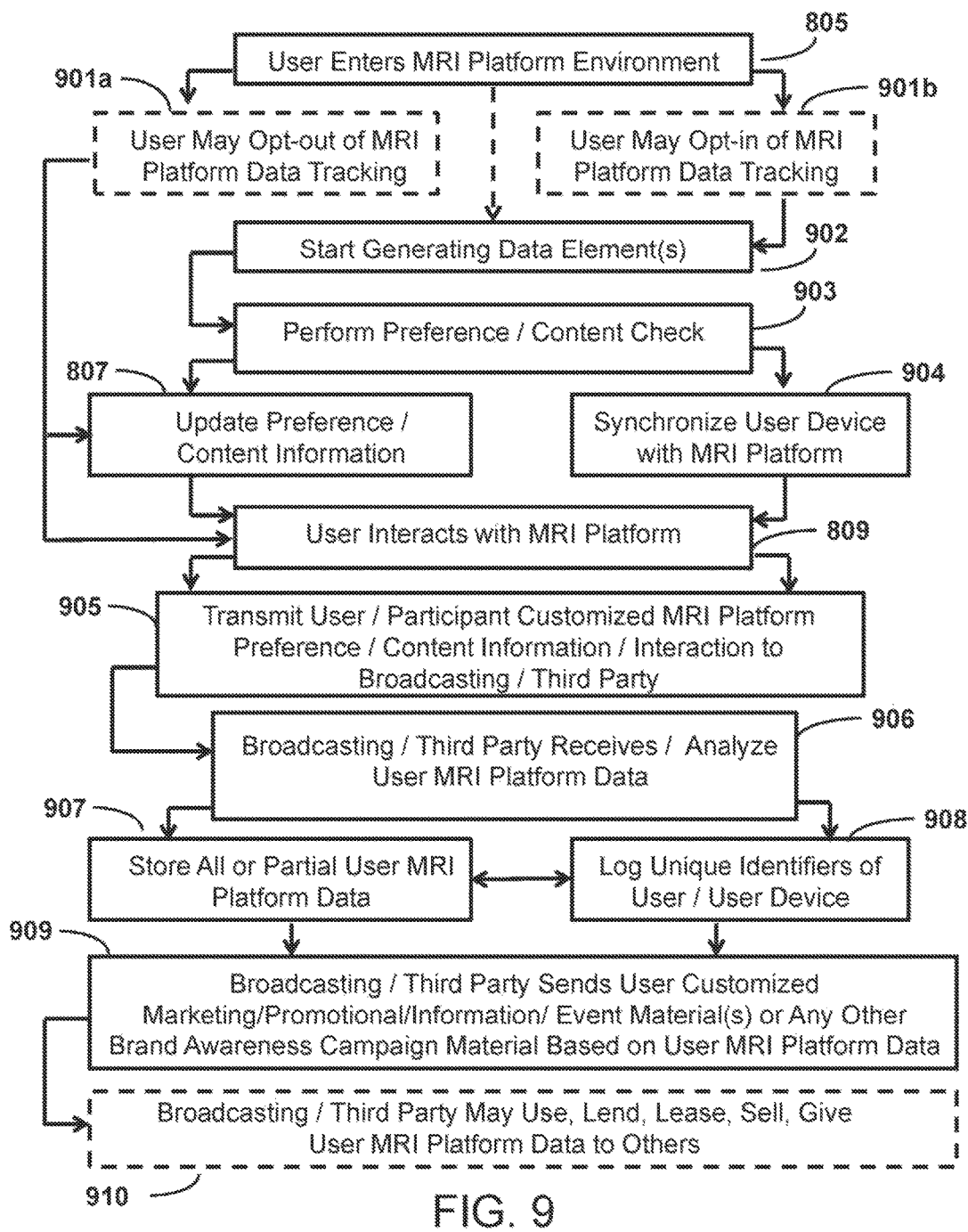
FIG. 9 is a flow diagram, illustrating steps for broadcasting/third party device(s)collecting, using, analyzing user customized MRI Platform data elements, in accordance with an embodiment of the present disclosure.

FIG. 9 is a flow diagram illustrating one embodiment of a method 900 for automatically generating, collecting, performing, monitoring, analyzing, saving transmitting (sending/receiving) data elements of participants (e.g. user, players, coaches, referees) within an active broadcasted live event and/or mixed reality immersive environment/scene. In step 805 in FIG. 9 (and in FIG. 8) a user 100 in possession of a user device 101 enters a broadcasted MRI Platform and may be prompted to opt-out of MRI Platform Data Tracking 901a or may opted-in of MRI Platform Data Tracking 901b. The user "Opt" selection may be stored and associated with the user for future broadcasted MRI Platform event(s). If user opt-out 901a, then user may still be able to enter, select, interact, and customize a broadcasted MRI Platform as described in FIG. 8.

In step 901b, if a user opt-in of the MRI Platform Data Tracking (which selection may already be stored), the generation of data element start as in step 902. In step 903 the broadcasting/third party device and/or user device may provide data elements to perform preferences and/or content check(s) and/or a user may receive/select customized information. In step 904, the broadcasted MRI Platform may synchronize a user device based on data element(s). Interaction 809 (as well as in FIG. 8) with the broadcasted MRI Platform may generate data elements such as 510 (in FIG. 5) of any participant of the broadcasted MRI Platform.

In step 905, the generated data element(s) (such as 510 in FIG. 5) of at least one user/participant of preferences and/or customized information and/or interaction data element are transmitted (e.g. send, receive) to at least one broadcasting/third party device and/or broadcasting entity or third party entity. In step 906, broadcasted MRI Platform data element(s) are received and analyze and may store all or partial data element(s) of the MRI Platform Data 907 which was collected, with at least one data element being a unique user/user device identifiers 908. Data element(s) may be stored in various format such as an example, but not limited as a text file and/or database. Data elements may also be stored locally or remotely (including cloud service) or a combination of both local and remote and may be on the user device and/or a broadcasting/third party device.

In step 909, at least one broadcasting/third party entity sends at least one user personalized/customized marketing brand awareness campaign material based on at least one data element of the MRI Platform Data which was collected. MRI Platform Data may be merged with other data mining element(s) to provide for a further enhanced personalization. Marketing brand awareness material may be sent by regular mail, email, electronic message (e.g., text message, quick response code, audio/visual), and phone call, shown on a display, or shown/displayed during the broadcasted MRI Platform. As an option, the broadcasting entity/third party entity may lend, lease, sell, give away, or use the MRI Platform Data in any manner that is acceptable.

Figure 10:
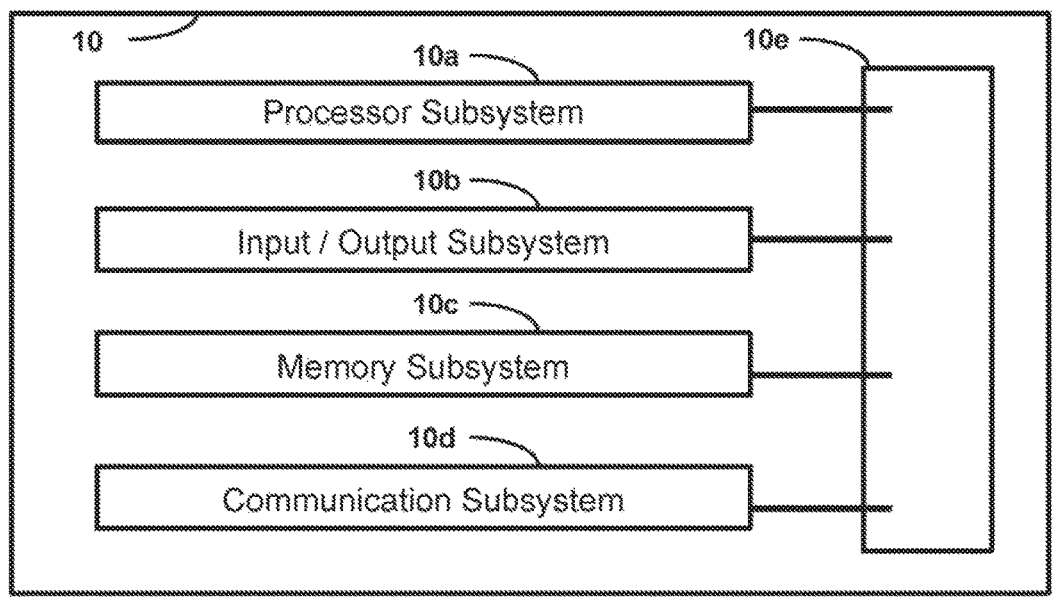
FIG. 10 is a schematic view illustrating an embodiment a device for implementing the system and method of customization broadcasting/third-party device using a user device in accordance with the present disclosure

FIG. 10 is a schematic view of an illustrative electronic device 10 capable of implementing the system and method of customizing a broadcasting/third party device which is associated with an active broadcasted live event and/or mixed reality immersive environment/scene using a user device which is associated with a consumer/end-user/user/player. The electronic device 10 is a representative device that may be a representative embodiment of the user device 101, the one or more broadcasting/third party device 300, and/or a portion of the user device and/or broadcasting/third party devices. The electronic device 10 may comprise a processor subsystem 10a, an input/output subsystem (including motion sensor) 10b, a memory subsystem 10c, a communication interface 10d, and a system bus 10e (also shown in FIG. 3). In some embodiment, one or more than one of the electron device components may be combined or omitted such as, for example not including the communications interface. In some embodiments, the electronic device 10 may comprise other components (such as 515 in FIG. 5) not combined or comprised in those shown in FIG. 10. For example the electronic device 10 may comprise a power subsystem. In other embodiments, the electronic device may comprise several instances of the components shown in FIG. 10. For example, the electronic device 10 may comprise multiple memory subsystems. For the sake of conciseness and clarity, and not limitation, one of each of the components is shown in FIG. 10.

The processor subsystem 10 may comprise any process circuitry operative to control the operations and performance of the electronic device 10. In various embodiments, the processor subsystem 10a may be implemented as a general purpose processor, a chip multiprocessor (CMP), a dedicated processor, an embedded processor, a digital signal processor (DSP), a network processor, a media processor, an input/output (1/0) processor, a media access control (MAC) processor, a radio baseband processor, a co-processor, a microprocessor such as a complex instruction set computer (CISC) microprocessor, a reduced instruction set computing (RISC) microprocessor, and/or a very long instruction work (VLIW) microprocessor, Software on Chip (SoC), or any other suitable processing device. The processor subsystem 1Oa also may be implemented by a controller, a microcontroller, an application specific integrated circuit (ASIC), a field programmable gate array (FPGA), a programmable logic device (PLID), and so forth.

In various embodiments, the processor subsystem 10a may be arranged to run an operating system (OS) and various applications. Examples of an OS comprise, for example, operating systems generally known under the trade name of Apple OS, Microsoft Windows OS, Android OS, and any other proprietary or open source OS. Examples of application comprise, for example, a telephone application, a camera (e.g. digital camera, video camera) application, a browser application, a multimedia application, a gaming application, virtual/augmented/mixed reality application, a messaging application (e.g., email, short message, multimedia), a viewer application, and so forth. Additionally, software may be implemented on a chip (e.g., SoC)

In some embodiments, the electronic device 10 may comprise a system bus 10d that couples various system components including the processing subsystem 10a, the input/output subsystem 10b, and the memory subsystem 10c. The system busy 10a can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronic (IDE), VESA Local Bus (VLD), Peripheral Component Interconnect Card International Association Bus (PCMCIA), Small Computers Interface (SCSI) or other proprietary bus, or any custom bus suitable for computing device applications.

Figure 11:
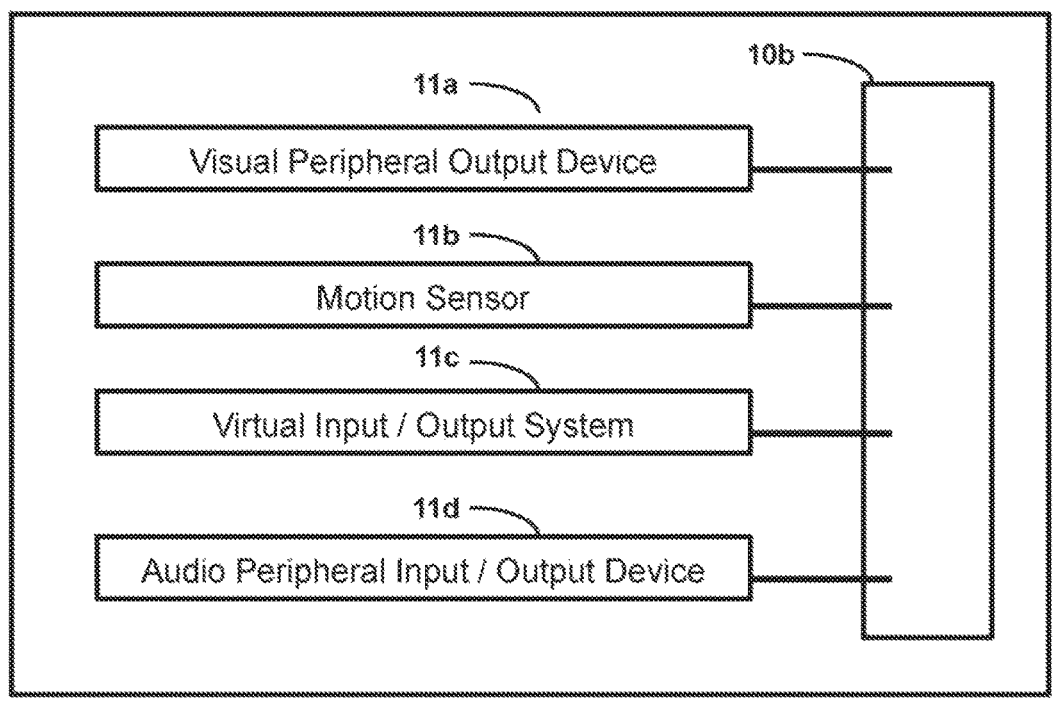
FIG. 11 is a schematic view illustrating an embodiment of the input/output subsystem, in accordance with the present disclosure

FIG. 11 shows one embodiment of the input/output subsystem 10b of the electronic device 10 shown in FIG. 10. The input/output subsystem 10b may comprise any suitable mechanism or component to at least enable a user to provide input to the electronic device 10 and the electronic device 10 to provide output to the user. For example, the input/output subsystem 10b may comprise any suitable input mechanism, including but not limited to a button, keyboard, keypad, click wheel, touch screen, speaker, microphone, or motion sensor. The input/output subsystem may facilitate interaction/customization within the broadcasted mixed reality immersive environment/scene. In some embodiments, the input/output subsystem 10b may comprise a capacitive sensing mechanism, or a multi-touch capacitive sensing mechanism which may facilitate interaction/customization within the broadcasted mixed reality immersive environment/scene.

In some embodiment, the input/output subsystem 10b may comprise output circuitry (including specialized circuitry) associated with output device such as, for example, an audio peripheral output device 11d. The audio peripheral output device 11d may comprise an audio output including on one or more speakers. The audio peripheral output device 11d also may comprise an audio component remotely coupled to audio peripheral output device 11d such as, for example, a headset, headphones, smart device 115, speaker(s) 130 and/or ear buds which may be coupled to the audio peripheral output device 11d through the communication subsystem 10d which may facilitate interaction/customization within the broadcasted mixed reality immersive environment/scene and allow the user to use at least one human/user senses.

In some embodiment, the input/output subsystem 10b may comprise a visual peripheral output device 11a for providing a display visible to the user. For example the visual peripheral output device 11a may comprise a screen such as, for example, a liquid crystal display (LCD), LED, OLEO screen which may be incorporated within a user device 101 and/or a smart device 115 such as, for example, but not limited to a television smart television, or infotainment device (which smart device could also be LCD, LED, OLEO for example). As another example, the visual peripheral output device 11amay comprise a movable display or projecting system for providing a display of content on a surface remote from the electronic device 10. In some embodiments, the visual peripheral output device 11a can comprise a coder/decoder, also known as Codec, to covert digital media data into analog signals (or vice versus). For example, the visual peripheral output device 11a may comprise video Codecs, audio Codecs, or any other suitable type of Codec or application.

The visual peripheral output device 11a also may comprise display drivers, circuitry for driving display drivers or both. The visual peripheral output device 11a may be operative to display content under the direction of the processor subsystem 10a. For example, but not limited, the visual peripheral output device 11a may be able to play media playback information, broadcasted mixed reality immersive environment/scene, application screens for application implemented on the electronic device 10, information regarding ongoing communications operations, information regarding incoming communications request, or device operation screens, to name only a few. The visual peripheral output device 11a may facilitate interaction/customization within the broadcasted mixed reality immersive environment/scene and allow the user to use at least one human/user senses.

In some embodiments, the input/output subsystem 10b may comprise a motion sensor 11b. The motion sensor 11b may comprise any suitable motion sensor operative to detect movement of electronic device 10. For example the motion sensor 11b may be operative to detect acceleration or deceleration of the electronic device as manipulated by a user. In some embodiments, the motion sensor manipulated by the user may be reflected/shown within the broadcasted mixed reality immersive environment/scene. In some embodiments, the motion sensor 11b may comprise one or more three-axis acceleration motion sensors (e.g., an accelerometer) operative to detect linear acceleration in three directions (e.g., the x or left/right direction, they or up/down direction, and the z or forward/backward direction). As another example, the motion sensor 11b may comprise one or more two-axis acceleration motion sensors which may be operative to detect linear acceleration only along each of x or left/right and y or up/down directions (or any other pair of directions). In some embodiment, the motion sensor 11b may comprise an electrostatic capacitance (capacitance-coupling) accelerometer that is based on silicon micromachine MEMS (Micro Electro Mechanical Systems) technology, a piezoelectric type accelerometer, a piezoresistance type accelerometer, or any other suitable accelerometer.

In some embodiments, the motion sensor 11b may be operative to directly detect rotation, rotational movement, angular displacement, tilt, position, orientation, eye movement, hand movement, motion along a non-linear (e.g., arcuate) path, or any other non-linear motions. For example, when the motion sensor 11b is a linear motions, additional processing may be used to indirectly detect some or all of the non-linear motions. For example, by comparing the linear output of the motion sensor 11b with a gravity vector e.g., a static acceleration), the motion sensor 11b may be operative to calculate the tilt of the electronic device 10 with respect to the y-axis. In some embodiments, the motion sensor 11b may instead or in addition comprise one or more gyromotion sensors, or gyroscopes for detecting rotational movement. For example, the motion sensor 11b may comprise a rotating or vibrating element which may facilitate interaction/customization within the broadcasted mixed reality immersive environment/scene and allow the user to use at least one human/user senses.

In some embodiments, the motion sensor 11b may comprise one or more controllers (not shown) coupled to the accelerometers or gyroscopes. The controllers may be used to calculate a moving vector of the electronic device 10. The moving vector may be determined according to one or more predetermined formulas based on the movement data (e.g., x, y, and z axis moving information) provided by the accelerometers or gyroscopes.

In some embodiments, the input/output subsystem 10b may comprise a virtual input/output system 11c. The virtual input/output system 11c is capable of providing input/output options by combining one or more components to create a virtual input/output type. For example, the virtual input/output system 11c may enable a user to input information through an on-screen keyboard which utilizes the touch screen and mimics the operations of a physical keyboard or using the motion sensor 11b to control a point on the screen instead of utilizing the touch screen or using voice commands to control movement, keyboard, or other operational instruction(s). As another example, the virtual input/output system 11c may enable alternative methods of input and output to enable use of the device by persons having various disabilities. For example, the virtual input/output system may convert spoken words to on-screen text words to enable a hearing-impaired user to operate interact within a broadcasted mixed reality immersive environment/scene.

Figure 12:
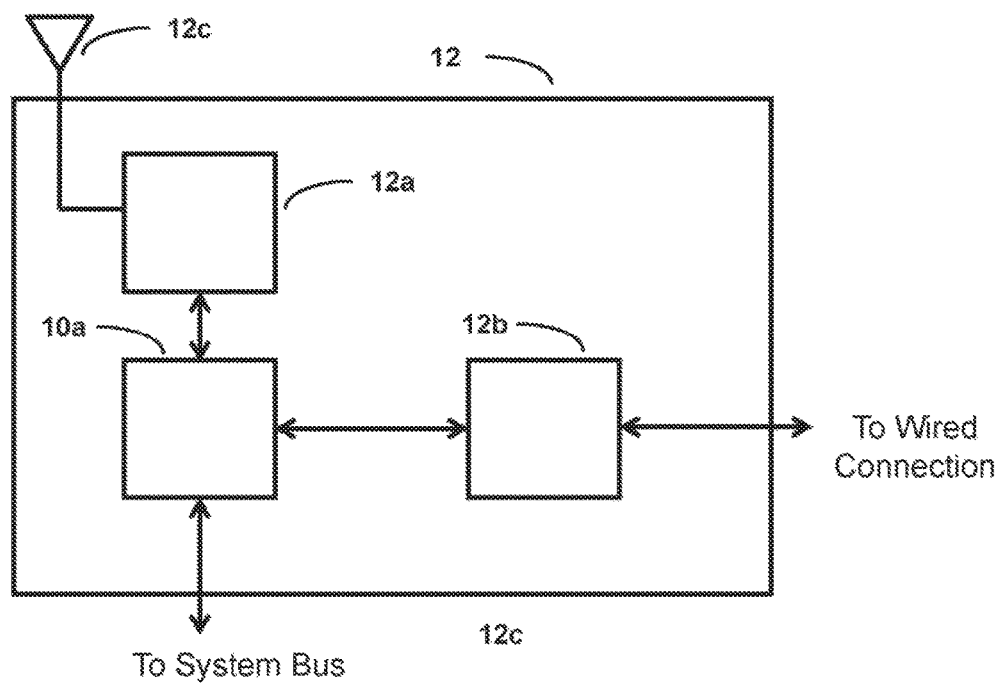
FIG. 12 shows one embodiment of the communication interface, in accordance with the present disclosure

FIG. 12 shows one embodiment of the communication interface 12. The communication interface 12 may comprises any suitable hardware, software, or combination of hardware and software that is capable of coupling the user device to one or more networks and/or additional devices (such as, for example one or more user device and/or one or more smart device and/or one or more broadcasting/third party device and/or broadcasting/third party sensors). The communications interface 12 may be arranged to operate with any suitable technique for controlling information signals using a desired set of communication protocols, services or operating procedures. The communication interface 12 may comprise the appropriate physical connectors to connect with a corresponding communications medium, whether wired or wireless.

Vehicles of communication comprises a network. In various embodiments, the network may comprise local area networks (LAN) as well as wide area networks (WAN) including without limitation Internet, wired, channels, wireless channels, broadcasting channels, communication device include telephones, computers, wire, radio, broadcasting, satellite, optical or other electromagnetic channels, and combination thereof, including other devices and/or components capable of/associated with communicating data. For example, the communication environment comprises in-body communications, various devices and various modes of communication such as wireless communications, wired communications, and combination of the same.

Wireless communication modes comprise any mode of communication between points (e.g., nodes, wireless access point) that utilize, at least in part wireless technology including various protocols and combination of protocols associated with wireless transmission, data, and devices. The points comprise, for example wireless devices such as user device, wireless headsets, audio and multimedia device and equipment, wearable device, wearable sensors, telephones, including mobile telephones and cordless telephones, and computers, servers (including networked) and computer-related devices and components such as printer, smart devices such as those discussed herein, and/or any other suitable smart device or third-party device not owned.

Wired communication modes comprises any mode of communication between points that utilize wired technology including various protocols and combination of protocols associated with wired transmission, data, and devices. The points comprise, for example devices such as broadcasting/third party device, video, audio and multimedia devices and equipment, such as audio players and multimedia players, telephones including mobile telephones and cordless telephones and two-way communication devices, and computers, servers (including network) and computer-related devices and components, such as printers, smart device such as those discussed herein, and/or any other suitable smart device or third party device. In various implementations, the wired communication modules may communicate in accordance with a number of wired protocols. Examples of wired protocols, but not limited, may comprise of Universal Serial Bus (USB) communication, RS-232, RS-422, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various embodiments, the communications interface 12 may comprise one or more interfaces such as, for example, not limited to a wireless communications interface 12a, a wired communication interface 12b, a network interface, a transmit interface, a receive interface, a media interface, a video interface, a system interface, a component interface, a switching interface, a chip interface, a controller, and so forth. When implemented by a wireless device or within wireless system, for example, the communication interface 12 may comprise wireless interface 12a comprising one or more antennas 12c, transmitters, receivers, transceivers, amplifiers, filters, control logic and so forth.

In various embodiments, the communication interface 12 may provide video, voice and/or data communications functionality in accordance with different types of broadcasting system(s), cellular radiotelephone system(s) or satellite system(s) or a combination of system(s). In various implementations, the described embodiments may communicate over wireless shared media in accordance with a number of wireless protocols. Examples of wireless protocols, but not limited may comprise various wireless local network (WLAN) protocols, including the Institute of Electrical and Electronics Engineers (IEEE) 802.xx serious of protocols, such as IEEE 802.11 a/b/g/n, IEEE 802.16, IEEE 802.20, and so forth. Other examples of wires protocols may comprise various wireless wide area network (WWAN) protocols such as GSM cellular radiotelephone system protocols with GPRS, CDMA cellular radiotelephone communication system with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification version v1.0, v1.1, v1.2, v2.0, v2.0 with Enhanced Data Rate (EDR), as well as one or more Bluetooth Profiles, and so forth. Yet another examples, but not limited of wireless protocols may comprise near-field communication techniques and protocols, such as electro=magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In various implementations, the described embodiments may comprise part of a cellular/broadcasting communication system. Examples of cellular/broadcasting communication systems, but not limited, may comprise CDMA cellular radiotelephone communication systems, optical communication system, radio communication system, cable broadcasting system, webcasting broadcasting system, High Definition Television (HDTV) broadcasting system, Digital Video Broadcasting (DVB-S) system, Digital Video Broadcasting-Cable (DVB-C) system, GSM cellular radiotelephone systems, North American Digital Cellular (NADC) cellular radiotelephone system, Time Division Multiple Access (TOMA) cellular radiotelephone system, Extended-TOMA (E-TDMA) cellular radiotelephone system, Narrowband Advanced Mobile Phone Service (NAMPS) cellular radiotelephone systems, third generation (3G) wireless standards systems such as WCDMA, CDMA-2000, UMTS cellular radiotelephone systems compliant with the Third-Generation Partnership Project (3GPP), fourth generation (4G), fifth generation (5G) wireless standard and so forth.

Figure 13:
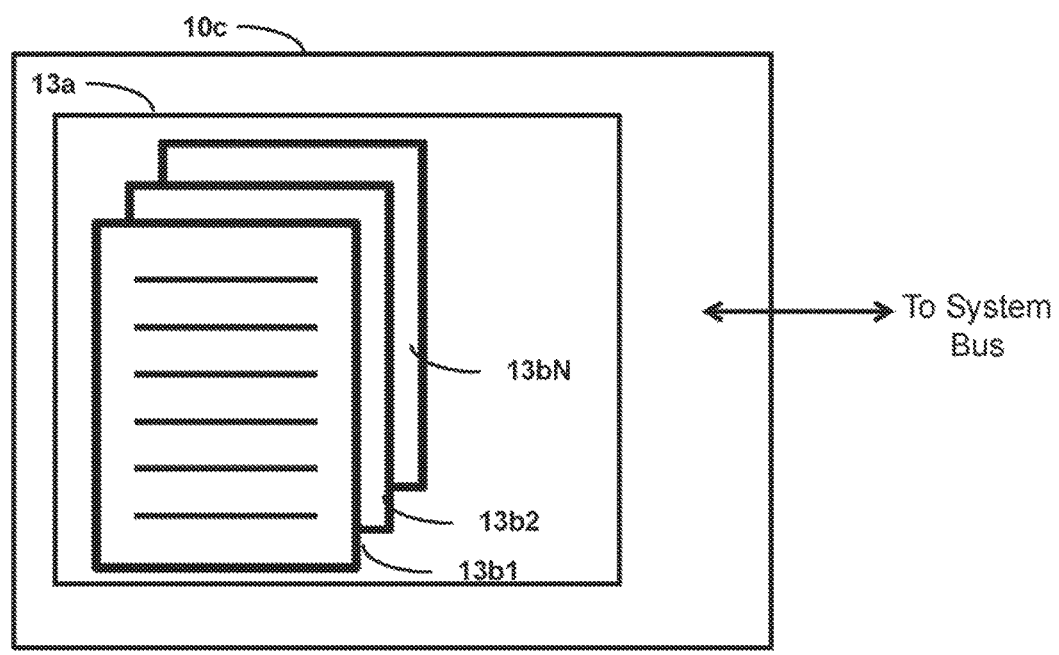
FIG. 13 illustrates an embodiment of the memory subsystem, in accordance with the present disclosure.

FIG. 13 shows one embodiment of the memory subsystem 1Oc. The memory subsystem 1Oc may comprise any machine-readable or computer-readable media capable of storing data, including both volatile/non-volatile memory and removable/non-removable memory. The memory subsystem 13 may comprise at least one non-volatile memory unit 13a. The non-volatile memory unit 13a is capable of storing one or more software programs 13b1-13bN. The software programs 13b1-13bN may contain, for example applications, user data, device data, and/or configuration data, or combination therefore to name only a few. The software programs 13b1-13bN may contain instructions executable by the various components of the electronic device 10.

In various embodiments, the memory subsystem 1Oc may comprise any machine-readable or computer-readable media capable of storing data, including both volatile/non-volatile memory and removable/non-removable memory. For example, but not limited, memory may comprise read-only memory (ROM), random-access memory (RAM), dynamic RAM (DRAM), Double-Data-Rate DRAM (DOR-DRAM), synchronous DRAM (SDRAM), static RAM (SRAM), programmable ROM (PROM), erasable programmable ROM (EPROM), electrically erasable programmable ROM (EEPROM), flash memory (e.g., NOR or NANO flash memory), content addressable memory (CAM), polymer memory (e.g., ferroelectric polymer memory), phase-change memory (e.g., ovonic memory), ferroelectric memory, silicon-oxide-nitride-oxide-silicon (SONOS)memory, disk memory (e.g., floppy disk, hard drive, optical disk, magnetic disk), or card (e.g., magnetic card, optical card), or any other type of media suitable for storing information. Additionally, memory subsystem may be located locally and/or remotely (including cloud base system).

In some embodiments, the memory subsystem 10c may contain a software program for transmitting and/or receiving customization information and/or data mining elements of a broadcasted mixed reality immersive environment/scene, user and/or other participants of the broadcasted mixed reality immersive environment/scene. In one embodiment, the memory subsystem 1Ocmay contain an instruction set, in the form of a file for executing a method of customization on a device 10. Examples of device, but not limited, the user device, smart device, broadcasting/third party device or any other suitable device associated with the broadcasted mixed reality immersive environment/scene. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a complier or interpreter is comprised to convert the instruction set into machine executable code for execution by the processing subsystem 1Oa.

It is understood that broadcasted live event/content/information and/or mixed reality immersive environment/scene/content may be all or partially associated with an intellectual property type of at least copyright, trademark, or patent, and broadcasted entity/third party entity may display appropriate intellectual property marking(s) to the user(s). Furthermore, the IP may be owned, controlled, licensed, or managed by one or more IP owner(s). Additionally, intellectual property may be referred to as IP, IP based, IP type, or intellectual property (or any combination) in the embodiment(s).

The above examples (including e.g.,) should not be construed as being limited but rather to convey the scope of the invention. Components, subsystem or other options may be added, deleted, modified, or rearranged as needed.

It is understood that that the above described arrangements are only illustrative of the application of the principles of the present invention. Numerous modification and alternative arrangements may be devised by those skilled in the art without departing from the spirit and scope of the present invention. Thus, while the present invention has been described above with particularity and detail in connection with what is presently deem to be the most practical and preferred embodiment(s) of the invention, it will be apparent to those of ordinary skill in the art that numerous modifications, including, but not limited to, variations in size, materials, shape, form, function, manner of operation, assembly, and use may be made without departing from the principles and concepts of the inventions.

It is understood that when an embodiment is referred hereinabove as being "placed on" another element, it can be directly on the other element or intervening elements may be present there between.

It is understood that when an embodiment is referred to hereinabove as a "user device/personal mobile device" that it could be referencing a smart phone, smart tablet, smart watch, smart card, smart wearable, or any other user device/personal smart devices as an example.

It is understood that, in some embodiments, a device such as user device, smart device, broadcasting/third party device, wearable smart/sensor(s) device (e.g. players, coaches, and/or referees) as an example, which are associated with a mixed reality immersive environment/scene/activity and/or an active live event could also be referred to as Device XXX where XXX represents a numeric and/or alpha value. Example of this could be: at least a Device #1 (user device) establishes at least a communication/connection with Device #2 (broadcasting/third party device), where Device #1 performs an at least a customization/interaction/preference within the Device #2 (broadcasting/third party) which may control, manage, monitor, or creates as an example a mixed reality immersive environment/scene. and where the mixed reality immersive environment/scene (MRI Platform) may contain Device #3, #3a, #3b, etc. (multi user), Device #4, #4a, #4b, #4c, etc. (multi existing team player(s), referees, coaches, etc.) and which may or may not be broadcasted/displayed/outputted to at least one Device #5, #5a, #5, etc. (smart device) as an example and where at least one Device XXX may be tagged/mapped to GPS coordination system. Furthermore, the use of Device XXX(s) enhances a user experience for an active live event and/or customized MRI Platform when user uses at least one human/user senses. Additionally, Device XXX may have data element(s) generated, collected, saved, shared, or analyzed as example.

It is further understood that these smart devices/internet of thing devices/internet of everything devices may be connected by network or direct connection to a smart media player which may control some or all content displayed or smart device(s) content may be controlled from a network device located elsewhere or a cloud based device. Additional, these smart devices may have software application installed to help with translation It is understood that when an embodiment is referred to hereinabove as a "user" or "consumer" or "end-user" or "player" that the reference is talking about the same person(s).

It is further understood that appropriate software and algorithms, housed or hosted on remote servers or any other device(s) or within any other device may be used for performing the various functions described here.

Spatially relative terms, such as "beneath," "below," "lower," "above," "upper," "next to" and the like, are used herein for ease of description to describe one element or feature's relationship to another element(s) or feature(s) as illustrated in the figures. It is understood that the spatially relative terms are intended to encompass different orientations of the devices in use or operations in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

It is further understood that appropriate software and hardware owned or not owned by a broadcasting television company and/or other third party may be used to facilitate the managing, creating, broadcasting, generating, updating, interaction, etc. of the mixed reality immersive environment/scene of a live event which are used by the user when the user activates a mixed reality immersive application.

It is further understood that the embodiments described hereinabove are not dependent on a body exoskeleton suit/exosuit and/or undersuit to provide a user with a fulfilled enhanced experience of a broadcasted live event/mixed reality immersive environment/scene (MRI Platform).

It is further understood that when an embodiment refers to a smart device that it could also be referred to as internet of thing device(s)/internet of everything device(s) or machine to machine communicating or internet of thing (loT) communication or Internet of Everything communication. Additionally, sensors associated with a broadcasted live event and/or mixed reality immersive environment/scene participant(s), may also be referred to as an internet of thing device/internet of everything device which are capable of transmitting (e.g., send/receive) data.

It is further understood that when an embodiment referees to "broadcasting" or "broadcasted" could be referring to the distribution/transmission of audio and/or video content (included virtual reality, augmented reality, mixed reality, immersive reality) to a dispersed audience via any electronic mass communication(s) medium. Distribution may be over-the-air (OTA), cable, internet, or any other acceptable method of providing content to a user. Additionally, multiplexing technique may be used which may comprise of frequency-division multiplexing, spatial multiplexing, wavelength division multiplexing or any other acceptable multiplexing technique as an example.

Example embodiments are described herein with references to cross section illustrations that are schematic illustrations of idealized embodiments. As such, variations from the shapes of the illustrations as a result, for example of manufacturing techniques and/or tolerances, are to be expected. Thus examples embodiments described herein should not be construed as limited to the particular shapes of regions as illustrated herein, but are to include deviations in shape or size that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes and/or sizes are not intended to illustrate the precise shape and/or size of a region and are not intended to limit the scope of the present claims.

In conclusion, herein is presented a system/method for automatically customizing a broadcasted mixed reality immersive environment/scene of a live event by a user in possession of at least user device. The disclosure is illustrated by examples throughout the written description and drawings. It should be understood that numerous variations are possible, while adhering to the inventive concept. Such variations are contemplated as being a part of the present disclosure.

What is claimed is:

1. A system for remotely interacting with a real-world event, comprising:
 a group of capture devices, each of the group of capture devices comprising a camera configured to capture scenes of the real-world event;
 a position sensor configured to detect a position of the group of capture devices;
 a processing unit communicatively coupled with the group of capture devices and the position sensor over the distributed network, the processing unit configured to:

receive, from each of the group of capture devices, the captured scenes;
receive, from the position sensor, the detected position of the group of capture devices;
generate an immersive representation of a physical environment of the real-world event using the captured scenes from at least two capture devices of the group of capture devices and the detected position of the at least two capture devices;
generate a mixed reality environment of the real-world event by modifying the immersive visual representation of the physical environment with virtual elements; and
transmit a signal including information of the mixed reality environment over one or both of the distributed network or a local connection; and
a first user device communicatively coupled with the processing unit, the first user device comprising:
a communication device configured to receive the signal;
a display configured to depict the mixed reality environment based on the information of the signal; and
an input device operatively coupled with the display and configured to detect input in response to a depiction of the mixed reality environment;
wherein the processing unit is further configured to modify the mixed reality environment in response to the input of the input device.

2. The system of claim 1, wherein the processing unit is further configured to, in response to the input, generate a constructed asset in the mixed reality environment that simulates manipulation of the immersive representation of the physical environment.

3. The system of claim 2, wherein:
the input device comprises a sensor configured to detect a characteristic of the input; and
the processing unit is further configured to:
modify the constructed asset in a first manner based on the characteristic of the input being a first value; and
modify the constructed asset in a second manner based on the characteristic of the input being a second value.

4. The system of claim 3, wherein the input is one or more of a touch input, a force input, a gesture, or a voice command.

5. The system of claim 2, wherein:
the input device is configured to detect a subsequent input in response to a depiction of the constructed asset in the mixed reality environment; and
the processing unit is further configured to modify the constructed asset in response to the subsequent input.

6. The system of claim 1, wherein:
the processing unit is further configured to determine tactile feedback information based on the mixed reality environment; and
the first user device further comprises a tactile structure configured to produce tactile feedback corresponding to the mixed reality environment.

7. The system of claim 6, wherein the tactile feedback information is determined in response to the simulated manipulation of the immersive representation of the physical environment in the mixed reality environment.

8. The system of claim 1, wherein the real-world event is a live event.

9. The system of claim 1, wherein the real-world event occurs in a programmed time window.

10. The system of claim 1, wherein:
the system further comprises a database communicatively coupled with the processing unit over the distributed network; and
the database comprises data elements characteristic of one or both of the real-world event or a first user associated with the first user device.

11. The system of claim 10, wherein:
the data elements include information associated with a physical location of the real-world event; and
the processing unit is further configured to:
retrieve the data elements over the distributed network; and
associate the group of capture devices with the real-world event based on the detected position of the group of capture devices and the physical location of the real-world event.

12. The system of claim 10, wherein:
the data elements include information associated with participants of the real-world event; and
the virtual elements of the mixed reality environment include a virtual representation of the information associated with the participants.

13. The system of claim 10, wherein:
the data elements include a profile of the first user of the first user device; and
the processing unit is further configured to customize the virtual elements based on the profile.

14. The system of claim 13, wherein the virtual elements include a virtual representation of the first user in the mixed reality environment.

15. The system of claim 1, wherein the position sensor comprises a plurality of position sensors, each of which is associated with a corresponding one of the group of capture devices.

16. The system of claim 1, wherein:
the system further comprises a second user device communicatively coupled with the processing unit over the distributed network; and
the second user device comprises a display configured to depict the mixed reality environment, as modified by the input of the first user device.

17. The system of claim 16, wherein:
the second user device comprises an input device operatively coupled with the display and configured to detect input in response to a depiction of the mixed reality environment;
the processing unit is further configured to modify the mixed reality environment in response to the input of the second input device; and
the display of the first user device is configured to depict the mixed reality environment, as modified by the input of the second user device.

18. The system of claim 1, wherein:
in a first mode, the display of the first user device is configured to depict the mixed reality environment from a point of view of a first of the group of capture devices;
in a second mode, the display of the first user device is configured to depict the mixed reality environment from a point of view of a second of the group of capture devices; and
the processing unit is further configured to alternate between the first mode and the second mode based on the input of the input structure.

19. A method of generating a mixed reality environment of a live event for a remote user, comprising:

accessing information associated with a physical location of the live event from a remote database over a distributed network;

automatically receiving a position of each of a group of candidate live event devices in substantial real-time, each of the group of candidate live event devices having a camera configured to capture scenes from a physical environment and an antenna configured to transmit captured scenes over the distributed network;

associating a subset of the group of candidate live event devices with the live event based, at least in part, on the physical location of the live event and the received positions, the associated subset defining a group of live event devices;

generating an immersive representation of a physical environment of the live event using scenes captured from at least a first live event device and a second live event device, each of the group of live event devices;

generating a mixed reality environment by modifying the immersive visual representation of the physical environment with virtual element; and causing a user device associated with the remote user to:
  in a first mode, depict the mixed reality from a point of view of the first live event device; and
  in a second mode, depict the mixed reality from a point of view of the second live event device.

20. A system for generating a mixed reality environment of a live event for a remote user, comprising:
  a processing unit; and
  a memory coupled to the processing unit, the memory for storing instruction which, when executed by the processing unit, causes the processing unit to:
    determine a first mobile device is a live event device based, at least in part, on a position of the first mobile device during a programmed time window;
    determine a second mobile device is a live event device based, at least in part, on a position of the second mobile device during the programmed time window;
    receive scenes of a physical environment, the scenes captured by both the first mobile device and the second mobile device;
    access a remote database having data elements that are characteristic of one or both of the live event or the remote user;
    generate a mixed reality environment of the live event based on each of:
      the scenes captured by the first mobile device;
      the scenes captured by the second mobile device; and
      the data elements of the remote database; and
    transmit a signal including information of the mixed reality environment to a user device.

* * * * *